(12) United States Patent
Edgar et al.

(10) Patent No.: US 9,754,363 B2
(45) Date of Patent: Sep. 5, 2017

(54) METHOD AND SYSTEM FOR PROCESSING IMAGE CONTENT FOR ENABLING HIGH DYNAMIC RANGE (UHD) OUTPUT THEREOF AND COMPUTER-READABLE MEDIUM COMPRISING UHD CONTENT CREATED USING SAME

(71) Applicant: Astral Images Corporation, Austin, TX (US)

(72) Inventors: Albert Durr Edgar, Austin, TX (US); Michael Charles Wilder, Dripping Springs, TX (US)

(73) Assignee: Astral Images Corporation, Austin, TX (US)

( * ) Notice: Subject to any disclaimer, the term of this patent is extended or adjusted under 35 U.S.C. 154(b) by 0 days.

(21) Appl. No.: 15/003,762

(22) Filed: Jan. 21, 2016

(65) Prior Publication Data

US 2017/0213328 A1 Jul. 27, 2017

(51) Int. Cl.
| | |
|---|---|
| G06K 9/00 | (2006.01) |
| G06T 5/00 | (2006.01) |
| G06T 5/50 | (2006.01) |
| G06T 7/00 | (2017.01) |
| H04N 1/60 | (2006.01) |
| G06T 7/40 | (2017.01) |

(52) U.S. Cl.
CPC .............. *G06T 5/009* (2013.01); *G06T 5/001* (2013.01); *G06T 5/50* (2013.01); *G06T 7/0081* (2013.01); *G06T 7/0097* (2013.01); *H04N 1/6027* (2013.01); *H04N 1/6072* (2013.01); *G06T 7/408* (2013.01); *G06T 2207/10004* (2013.01); *G06T 2207/10016* (2013.01); *G06T 2207/10024* (2013.01); *G06T 2207/20208* (2013.01); *G06T 2207/20221* (2013.01)

(58) Field of Classification Search
CPC .......... G06T 5/007; G06T 2207/20112; G06K 9/6201
See application file for complete search history.

(56) References Cited

U.S. PATENT DOCUMENTS

| | | | |
|---|---|---|---|
| 2016/0165256 A1* | 6/2016 | Van Der Vleuten | H04N 9/68 375/240.01 |
| 2016/0253792 A1* | 9/2016 | Xu | H04N 1/6052 345/590 |
| 2016/0344990 A1* | 11/2016 | Kozuka | G09G 5/00 |

* cited by examiner

*Primary Examiner* — Phuoc Tran
(74) *Attorney, Agent, or Firm* — David O. Simmons

(57) ABSTRACT

Implementations disclosed herein (e.g., systems, methods, and computer-readable program products) provide a high definition range "UHD" compatible version of classic image content (e.g., as-released motion pictures) that was created in an era of limited dynamic range and that maintains aesthetic characterization defined by "Director's Intent" of the classic image content. Such implementations advantageously use clues to the Director's Intent found in the classic image content to make intelligent estimations as to what a Director (or other image content editing professional) was attempting to achieve in the classic image content relative to a corresponding original image content (e.g., as-shot image content). The original image content holds original imagery details that have been altered or omitted during creation of corresponding classic image content. The classic image content exhibits attributes that reflect the Director's Intent such as, for example color, contrast, vignetting, saturation, and the like.

10 Claims, 14 Drawing Sheets
(5 of 14 Drawing Sheet(s) Filed in Color)

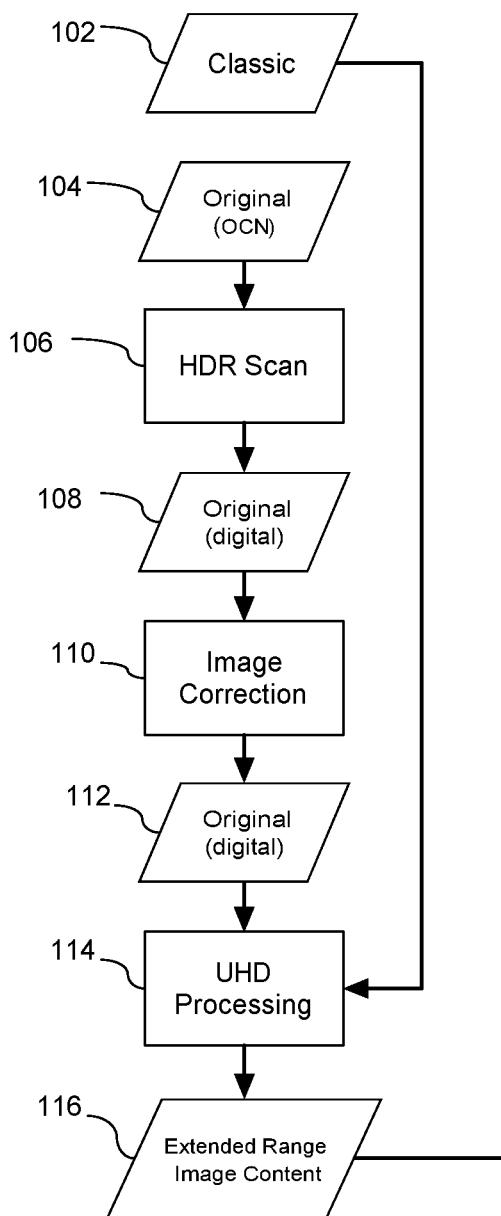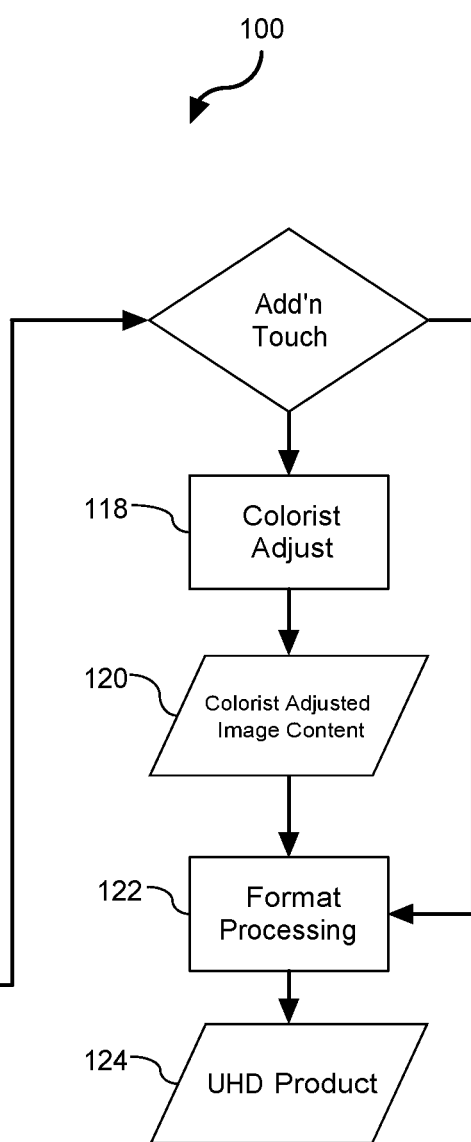
FIG. 1

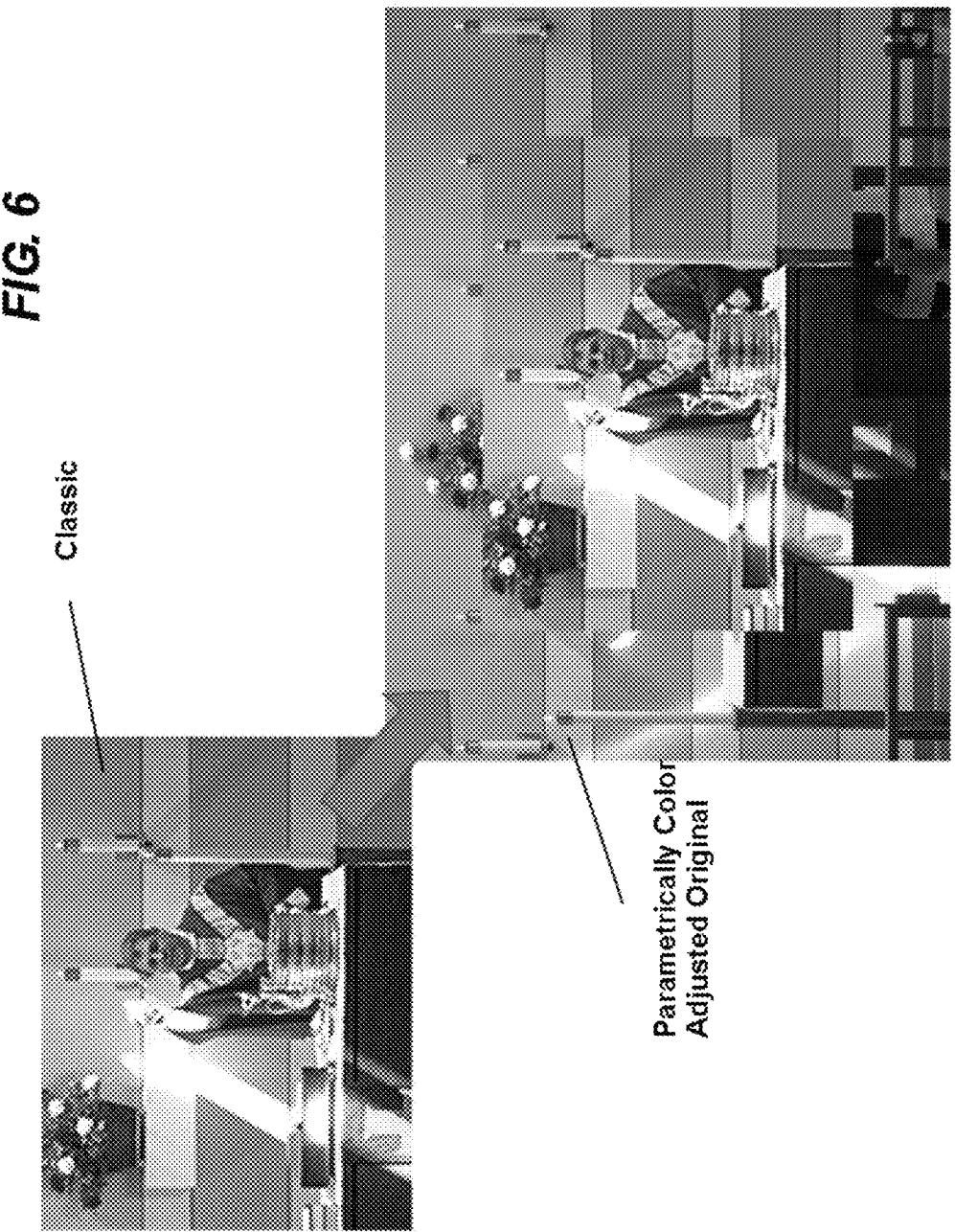

METHOD AND SYSTEM FOR PROCESSING IMAGE CONTENT FOR ENABLING HIGH DYNAMIC RANGE (UHD) OUTPUT THEREOF AND COMPUTER-READABLE MEDIUM COMPRISING UHD CONTENT CREATED USING SAME

FIELD OF THE DISCLOSURE

The disclosures made herein relate generally to processing of image content such as in the form of motion pictures and still image photographs and, more particularly, to processing of motion picture image content for enabling high dynamic range (UHD) output thereof.

BACKGROUND

It is known that a considerable amount of motion picture content was created in a format suitable for television screens or theatrical projection with limited brightness. Such motion picture content (and other similar forms of image content) is referred to herein as legacy image content. Full light was typically used in creation of legacy image content whereby brilliant areas of light needed to be clipped, in order not to darken the entire scene. Deeper in the creative process, studio lighting, as well as professional still image studio lighting, needed to fill shadows to limit the range of scenes to typically a ratio of 1:3. However, as the brightness of digital displays has increased, artists have had wider discretion to use this wider range. This can be seen it different artistic lighting of modern movies, and a slow change in the aesthetic of motion picture art.

It is also known that, in recent years, there has been a migration way from fill lighting. As a result, motion picture content that intentionally have brilliant details that require the display to hit very high brightness levels, and intentional deep shadow detail that require the display to reproduce full blacks. This type of motion picture content (i.e., image content) is said to have Ultra High Definition (UHD) or High Dynamic Range (UHD).

Image content that reflects the imagery intentions of the director or other professional responsible for creating the image content (i.e., "the Director's Intent") is referred to herein as "classic image content". An example of classic image content is a movie (e.g., i.e., motion picture) that has been available in the world for viewing by the general public (e.g., in the form print film, DVD, etc) and that was created prior to the UHD capability in televisions. A common type of classic image content is legacy image content (i.e., legacy-type classic image content), which was created prior to the advent of playback equipment having UHD capability and, thus, often has low resolution and limited detail in the highlights and shadows.

Legacy-type classic image content is created by an image mastering professional (e.g., a "colorist") through manipulation of image content that has not yet been subjected to the Director's Intent (i.e., original image content). For example, the original image content may be manipulated so that the color and illumination aesthetics are assumed to be just right and may include other artistic manipulations such as spatial effects (e.g., vignetting) and global effects (e.g., cross development). In this respect, it is common for the legacy-type classic image content to have been approved by the creator or director of the original image content and represents the content that is intended and preferred for public viewing.

The original image content is preferably as close to the as-captured original scene as currently exists or available. For example, the original image content can be in the form of an original camera film negative, raw digital data, or whatever is available closest to the original scene. Notably, the original image content does not bear the Director's Intent. However, relative to corresponding legacy-type classic image content, the original image content does bears more information in the form of resolution, detail in the highlight and shadows, and ability to recover and image with less damage. It is disclosed herein that the original image content can be from more than one or more sources.

Classic image content (legacy-type or otherwise) reflects the aesthetics that has been approved by the director (i.e., represents the Director's Intent) and that bears the color and stylistic look that would make for a preferred form of image content that is UHD compliant. This form of image content is referred to herein as UHD-compliant classic image content. A problem arising from prior art approaches for generating UHD-compliant classic image content is that the Director's Intent in classic image content does not anticipate UHD imagery. Accordingly, a perfect technical UHD processing of the original image content may be completely counter to the Director's Intent. As an example, in the classic image content an open window may have been intended to simply be white and ignored, but in UHD-compliant classic image content created using a prior art approach, the window may become so bright with so much distracting detail that other action in the room is overpowered. As another example, in classic image content, an up-view of a man looking down may have intended the sky in back of the man to be soft, but in the UHD-compliant classic image created using a prior art approach, the sky may be blindingly bright such that it overpowers facial expressions and creates a focus on the details in the sky (e.g., birds and clouds) rather than the facial expressions of the man. Thus, as shown in these examples, countermanding the Director's Intent, no matter how "accurate" technically, the artistic intent, and probably the storyline, is put in jeopardy.

Creating UHD-compliant classic image content via known approaches involves manipulating corresponding original image content to create corresponding UHD-compatible image content. More specifically, the visual characteristic of a frame or scene being created as part of the UHD-compliant classic image was manually matched to that of a corresponding frame or scene of corresponding classic image content by adjusting a series of parameters. In this "parametric" approach, the tools available to the professional conducting the UHD processing (e.g., a colorist) typically consist of a series of knobs (i.e., parametric knobs). These parametric knobs (e.g., each controlling on of red, green, blue, or grey brightness) are applied to the original image content in an attempt to match the color aesthetics in the classic image content. Although the professional conducting the UHD processing is assumed to have a basic and accurate translation from a film negative to positive in place as a simulation of print film, such professional would have also had a choice of types of film and modifiers. Because of the archaic chemical and electronic intermediates introduce many anomalies and variables into the UHD processing, compensating for anomalies and variables would require additional parametric knobs such as for adjusting contrast, brightness, toe and shoulder roll off, and the like. In the parametric approach, a human or a computer would adjust the knobs to get a reasonable match of the manipulated version of the original image content and the classic image content.

As understood by a person of ordinary skill in the art, one obvious limitation of this parametric approach to creating UHD-compliant classic image content is either having too few knobs or too many knobs, such that they become over-specified which can lead to contouring. For example, if an image has a continuous scale, the image shows distinct steps when such contouring occurs (e.g., using too few bits to represent an image is an easy way to introduce contouring). However, even with sufficient bits, if the representation of color intensity is not continuous or not continuously increasing with increasing intensity, contouring and other artifacts can occur an effect similar to banding. Another obvious limitation of this parametric approach to creating UHD-compliant classic image content is that any spatial effects (i.e., varying with space) such as, for example, intentional or accidental vignetting anywhere in the original process can lead to very bad results. For example, if the center of an image was initially darker than the edges and the printing process darkened the edges through vignetting, the parametric approach would choose a low contrast to balance brightness globally, although regionally the image aesthetic would be softened by lowered contrast and would produce a very different aesthetic than that of the Director's Intent.

Therefore, creating UHD-compliant classic image content in a manner that combines desirable imagery features of classic image content with desirable imagery features of corresponding original image content and that overcomes imagery limitations associated with known approaches for processing such original image content would be advantageous, desirable and useful.

SUMMARY OF THE DISCLOSURE

Embodiments of the present invention are directed to creating image content that is configured for UHD playback. More specifically, embodiments of the present invention are directed to generating UHD-compliant classic image content from corresponding original image content and legacy-type classic image content. Such UHD-compliant classic image content combines desirable imagery features of legacy-type classic image content with desirable imagery features of corresponding original image content. Such combination is implemented in a manner that maintains imagery intentions of the director (or other professional) responsible for creating the image content (i.e., Director's Intent) exhibited in legacy-type classic image content with imagery obtained from within the corresponding original image content from which the legacy-type classic image content was created. In this respect, embodiments of the present invention are beneficial in recreating an UHD compatible version of legacy image content (e.g., motion pictures) that was created in an era of limited dynamic range and that maintains the Director's Intent when played back using an UHD display standard.

An object of embodiments of the present invention is to create UHD-compliant classic image content characterized by such image content maintaining the Director's intent of corresponding classic image content and including aesthetic characteristics present in original image content from which the classic image content was created.

Another object of embodiments of the present invention is for UHD-compliant classic image content to include feature details and accent details from the original imagine content that are not in the corresponding classic image content.

Another object of embodiments of the present invention is for UHD-compliant classic image content to include image content in a frame or scene in the original image content but outside of an overlapping area of the classic image content and the original image content for such frame or scene.

Another object of embodiments of the present invention is for creation of the UHD-compliant classic image content to include creating a mask defining an overlapping area of the classic image content and the original image content on a per-frame and/or per-scene basis.

Another object of embodiments of the present invention is for UHD-compliant classic image content to for original image content outside an area of the mask to include aesthetic characterization consistent with the Director's Intent for image content of the classic image content within the area of the mask.

Another object of embodiments of the present invention is for creation of the UHD-compliant classic image content to include resizing and aligning the classic image content to the original image content on a per-frame and/or per-scene basis.

Another object of embodiments of the present invention is for creation of the UHD-compliant classic image content to include subjecting classic and corresponding original image content to color match processing.

Another object of embodiments of the present invention is for color match processing to include parametric color match processing and pryus color match processing.

Another object of embodiments of the present invention is for creation of the UHD-compliant classic image content to include subjecting color matched original image content to extended range processing.

Another object of embodiments of the present invention is for the extended range processing to provide feature details and/or accent details to the color matched original image content.

Another object of embodiments of the present invention is for the extended range processing to apply high frequency image content of the original image content to the color matched original image content.

It is disclosed herein that the present invention can be embodied in various forms. One such form is a method for creating UHD-compliant classic image content. Another such form is a computer-readable program product having UHD-compliant classic image content created in accordance with a method configured in accordance with the present invention accessible therefrom (e.g., from within memory thereof). Still another such form is a system displaying UHD-compliant classic image content created in accordance with a method configured in accordance with the present invention.

In one embodiment of the present invention, a computer-implemented method comprises a plurality of operations. An operation is performed for determining an overlapping area of image content of at least one original image content source and image content of a classic image content source in which visual imagery of the classic image content aligns with visual imagery of a corresponding portion of the original image content. An operation is performed for performing a parametric color match of the original image content as a function of the classic image content to create linear matched original image content and parametrically color matched original image content. Performing the parametric color match includes matching image content color of the original image content to the classic image content as a function of a color comparison information derived from the classic image content and the original image content within the overlapping area. An operation is performed for performing a pyrus color match using the parametrically color matched original image content and the classic image content to produce pyrus color matched original image content. The pyrus color matched original image content is characterized by color intensity altered in accordance with Director's Intent of the classic image content.

In another embodiment of the present invention, a method is performed for processing image content. The method comprises a plurality of operations. An operation is performed for providing first image content and second image content. The second image content is characterized by a Director's Intent applied thereto and the second image content is characterized by image content thereof having color attributes altered by the Director's Intent with respect to the first image content. The second image content includes at least a portion of visual imagery of the first image content. An operation is performed for registering the first image content and the second image content to defining an overlapping area of the first image content and the second image content in which visual imagery of the second image content aligns with visual imagery of a corresponding portion of the first image content. An operation is performed for determining aesthetic characterization defined by the Director's Intent as a function of the second image content and the portion of the first image content within the overlapping area. An operation is performed for applying the aesthetic characterization to an entire area of the first image content to create color matched original image content.

In another embodiment of the present invention, a non-transitory computer-readable storage medium has tangibly embodied thereon and accessible therefrom instructions interpretable by at least one data processing device. The instructions are configured for causing the at least one data processing device to perform a method comprising a plurality of operations. An operation is performed for providing original image content and classic image content. The classic image content includes at least a portion of visual imagery of the original image content. An operation is performed for determining an overlapping area of the original image content and the classic image content in which the visual imagery of the classic image content aligns with the visual imagery of a corresponding portion of the original image content. An operation is performed for determining color attributes of the classic image content that characterize post-processing actions performed with respect to the first image content. The color attribute determining includes comparing image color information from the classic and original image contents within the overlapping area. An operation is performed for creating color matched original image content characterized by having the color attributes applied thereto. An operation is performed for applying extended range image content to the color matched original image content. Applying the extended range image content includes determining color in areas of the color matched original image content that are in the saturated color condition with respect to a color saturation range of the classic image content and adjusting color in at least a portion of the areas of the color matched original image content that are in the saturated color condition to a color unsaturated condition.

In another embodiment of the present invention, a non-transitory computer-readable medium has tangibly embodied thereon and accessible therefrom processor-interpretable information defining displayable image content, the processor-interpretable information. The processor-interpretable information comprises image content in a digital format generated using a method comprising a plurality of operations. An operation is performed for providing first image content and second image content. The second image content is characterized by a Director's Intent applied thereto and the second image content is characterized by image content thereof having color attributes altered by the Director's Intent with respect to the first image content. The second image content includes at least a portion of visual imagery of the first image content. An operation is performed for registering the first image content and the second image content to defining an overlapping area of the first image content and the second image content in which visual imagery of the second image content aligns with visual imagery of a corresponding portion of the first image content. An operation is performed for determining aesthetic characterization defined by the Director's Intent as a function of the second image content and the portion of the first image content within the overlapping area. An operation is performed for applying the aesthetic characterization to an entire area of the first image content to create color matched original image content.

In another embodiment of the present invention, a non-transitory computer-readable medium has tangibly embodied thereon and accessible therefrom processor-interpretable information defining a displayable visual experience. The processor-interpretable information comprises extended range image content jointly derived from image content of at least one original image content source and from image content of a classic image content source. The classic image content is a derivative of the original image content. The extend range image content is characterized by extended range image content defined by a Director's Intent of the classic image content.

These and other objects, embodiments, advantages and/or distinctions of the present invention will become readily apparent upon further review of the following specification, associated drawings and/or appended claims.

BRIEF DESCRIPTION OF THE DRAWINGS

This application contains at least one drawing executed in color. Copies of this patent or patent application publication with color drawing(s) will be provided by the Office upon request and payment of the necessary fee.

FIG. 1 is a flow diagram view showing a method configured in accordance with an embodiment of the present invention for creating UHD-compliant classic image content.

FIG. 6 is a color photograph view showing parametric linear fit corrected original image content being matched to corresponding classic image content.

DETAILED DESCRIPTION

Figure 2:
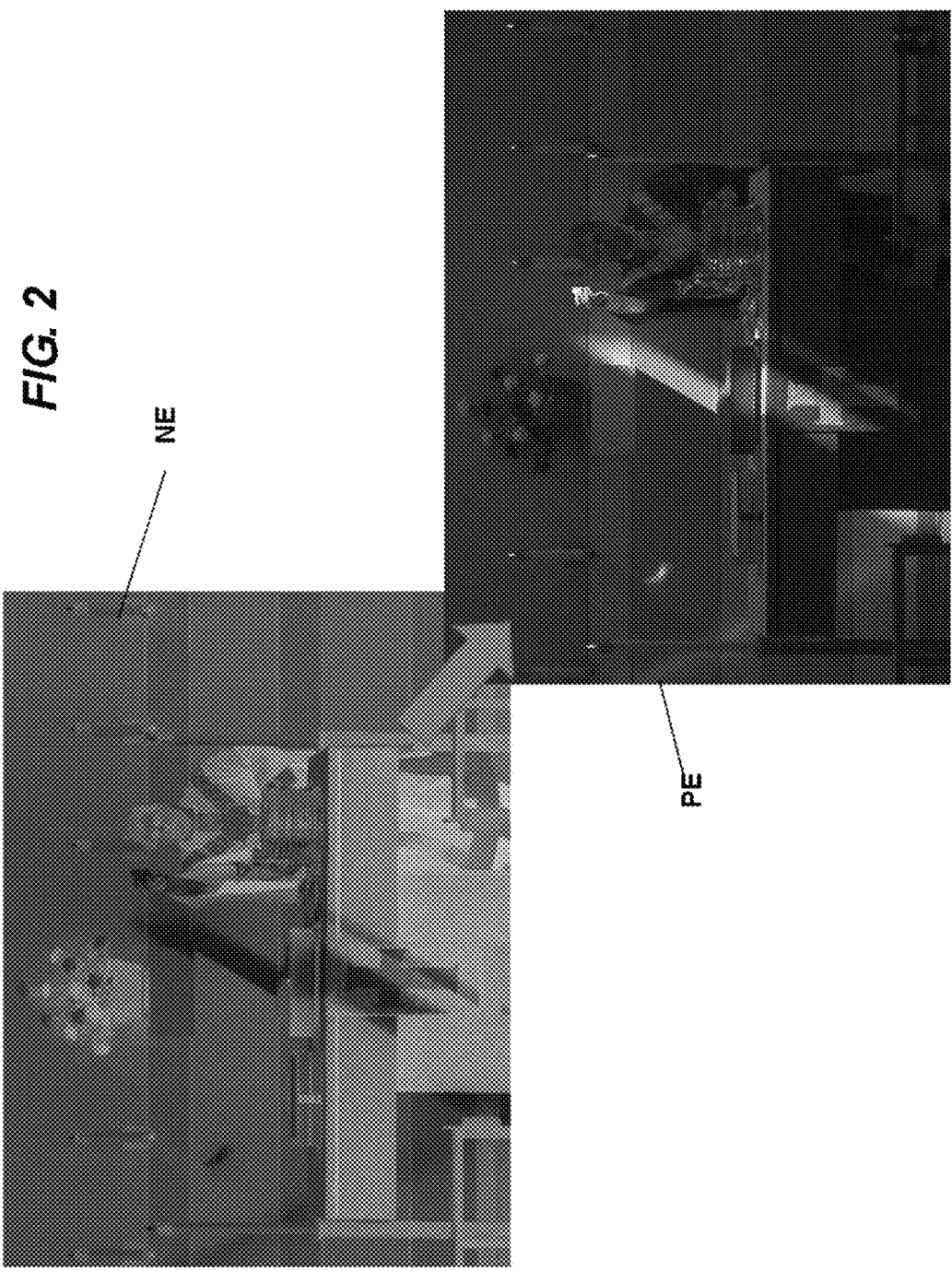
FIG. 2 is a color photograph view showing conversion of original image content from a negative exposure format to a positive exposure format.

In accordance with embodiments of the present invention, UHD-compliant classic image content is created using corresponding original image content (e.g., original camera negative (OCN), film intermediate, digital intermediate which has an extended range or more than one source of original image content.) and legacy-type classic image content that was created from the original image content. One example of OCN is color negative film, which generally exhibits full dynamic range, color gamut, and other "accuracy" aspects (i.e., beneficial exposure characteristics) such that a full range of an original scene(s) in the original image content can be sufficiently replicated (e.g., digitally) and displayed with technical fidelity. In any case, preferably, the original image content utilized in embodiments of the present invention is as close as possible to the originally-captured scene (i.e., as-filmed scene) as currently exists or available. The key attribute of the original image content is that it holds imagery details of the originally-captured scene (i.e., original imagery details) that have been altered or omitted during creation of corresponding classic image content (e.g., creation of classic image content from original image content corresponding thereto).

In contrast to the original image content, classic image content exhibits attributes that reflecting the Director's Intent. Legacy-type classic image content will generally lacks attributes such as highlights, shadows, smooth grain, and resolution detail available from a corresponding OCN (i.e., original image content), However, legacy-type classic image content will preferably have color, contrast, vignetting, saturation, and other imagery details defined by the Director's Intent (director's imagery details).

High Dynamic Range Aesthetic Match

It is not possible to know exactly what a Director (i.e., a classic image content creating professional) would have done in creating legacy-type classic image content from corresponding original image content had that Director been privy to UHD capabilities. However, embodiments of the present invention advantageously use clues to the Director's Intent found in the legacy-type classic image content to make intelligent estimations as to what the Director was attempting to achieve in the classic image content relative to the corresponding original image content. Such intelligent estimations are referred to herein as UHD aesthetic match processing. To that end, embodiments of the present invention are configured for creating a new instance of image content (i.e., UHD-compliant classic image content) characterized by classic mage content that is provided with UHD attributes and that maintains the aesthetic characterization defined by the Director's Intent. One example of such aesthetic characterization includes retaining all basic color correction, reproducing luminance in large areas and reproducing color intensity (highlights) in areas of limited relative size. For example, an open window and background sky in a scene would have the same (or approximately the same) brightness that it was in the classic image content, all unsaturated colors and contrasts would match the classic image, and from a distance, an audience would experience the luminance of the classic image. Another example of such aesthetic characterization includes restoring color to saturated areas. Thus a saturated sky or an open window should reveal natural blue or golden light. Taking a clue from classic painters through the centuries, it may be preferred for color saturation to be less than 100% (e.g., hue and more than half the chroma intensity relative to the luminance). Another example of such aesthetic characterization includes re-introducing accent details (e.g., lights in eyes, shimmer from sequins on dresses, luminary points like holiday lights, sparkles from jewelry, flashes of light from explosions and the like) that were saturated out during creation of the classic image content. It is preferred to see the colors and brightness of such accent details, bit in balanced ratio and/or proportion to the newly created image content. Another example of such aesthetic characterization includes re-introducing feature details (e.g., foreground features, background features, skin definition, and the like) at were saturated out during creation of the classic image content. Preferably, these feature details will be reintroduced with the same or similar brightness as in the classic image content (e.g., about half in areas of the classic image that have saturated completely). Thus, a generalized characterization of the aesthetic characterization is for the regional brightness of the classic image to be matched, for accent details from the original image to be reintroduced, for color of the classic image to be maintained or reintroduced to at least about half the level of the original image content, and for feature detail from the classic image content to be maintained and to be at least partially reintroduced from the original image content.

These and other goals of UHD aesthetic match processing can be accomplished by embodiments of the present invention by the following process operations (i.e., UHD aesthetic match process). For a given scene or series or scenes, classic image content and original image content (e.g., as defined above) are provided. The classic image content and the original image content are processed with a "sharp-unsharp mask" to produce "classic-derived image content" and "original-derived image content", which jointly define the underlying basis (i.e., code to life) for the Director's Intent. Preferably, the sharp/unsharp mask is a blurring filter that maintains the sharpness of strong edges while blurring weak detail. For example, the sharp/unsharp mask can be similar to a well-known "surface blur" in which integrated weighting is a function of distance as well as pixel count level spread. It can be implemented as a surface blur in a pyramid (e.g., an iterative series of frequency levels) such that strong impulses are also blurred if they comprise a small area. It is disclosed herein that a sharp-unsharp mask in accordance with embodiment of the present invention is used as a control in many commercial implementations of shadow fill, such as Digital SHO and Adobe Photoshop (i.e., via menu selection of Image>Adjustments>Shadows/Highlights). After the classic-derived image content and the original-derived image content are generated, the classic-derived image is subtracted (e.g., numerically) from the classic image content and the original-derived image is subtracted (e.g., numerically) from the original image content, thereby respectively producing "classic image characterizing content" and "original image characterizing content". Next, the classic-derived image is combined with the original image characterizing content image to create resulting UHD-compliant classic image content, which is an image combining the artistic aesthetic of the original image content plus the aesthetic of modern UHD image content.

A variation of the UHD aesthetic match processing is to combine a pre-selected or controlled proportion of the derived image and image characterizing content versions of the classic and original image content with such proportions being greater than 0% and less than 100%. For example, some of the original image characterizing content can be combined with proportionally less of the original image characterizing content to form the UHD-compliant classic image content. In the preferred embodiment, this combining is nonlinear so as to be the maximum of the original image characterizing content and a selected proportion of the original image characterizing content. Thus, the original image characterizing content acts as a "safety net" for detail that was lost to saturation.

A further variation of the UHD aesthetic match processing first separates the various image content instances into a luminance-chrominance space such as YUV or Lab, and selects different proportions as described above for the luminance channels than for the chrominance channels. YUV refers to a color space in which "Y" is the luminance (brightness) channel and "UV" is the chrominance (color) channels. In particular, an increased amount of the original-derived image content and proportionally less of the classic-derived image content is combined for the chrominance channels to form the UHD-compliant classic image content. In the preferred embodiment, this combining is nonlinear and is the maximum of the classic-derived color and a selected proportion, typically more than half, of the original-derived color.

In a further variation of the UHD aesthetic match processing, the optimum ratio of mixture is established, and images calculated for, two displays with different levels of UHD. The difference between the two is further compressed and transmitted with the main image as a small sidecar image. At reception, select proportions of the sidecar image are applied to the main image to produce optimum viewing for a range of displays under a range of ambient lighting conditions.

Color Match Using Detail Tracking

As previously discussed, classic image content is typically approved by the creator-director of such content and has color aesthetics and artistic manipulations (e.g., spatial effects like vignetting and global effects like cross development) that are assumed to represent the Director's Intent. In this respect, legacy-type classic image content for a given title is a common form of image content that the public has become used to seeing and, for archival and curation purposes, it is the form of image content that must be matched when creating a UHD-compliant version of such legacy-type classic image content.

It is well known that legacy-type classic image content often has serious artifacts. This is because it is common for legacy-type classic image content to have been taken from an aged video stream. As a result, it is not uncommon for such image content to have low resolution and even lower chromatic resolution, to have electronic artifacts such as "ringing", and to have digital compression artifacts that remove subtle detail. Additionally, it may be from a multi-generational print in order to get through archaic chemical editing processes to a distribution print, whereby it has low resolution, graininess, and embedded defects (e.g., dust and scratches). In summary, the "classic" image is a beloved memory that is definitely not ready for modern ultra-high-resolution commercial distribution.

As previously discussed, original image content (e.g., original camera negative ("OCN")) has imagery details that corresponding legacy-type classic image content lacks. In this respect, as compared to corresponding legacy-type classic image content, the original image content has higher resolution, less graininess, fewer artifacts, and far more accent and feature detail. The original image content, however, has none of the manipulations characterizing the Director's Intent in addition to its brightness and color varying greatly.

Advantageously, embodiments of the present invention preferably implement color match processing. The objective of such color match processing is to create a combined version of legacy-type classic image content and corresponding original image content, which closely (preferably exactly) matches the aesthetics of the classic image content and that has full resolution, beautiful, modern image. Ideally, color match processing would include extracting UHD detail from the original image content and merging it with the legacy-type classic image content to form resulting reconstructed UHD image content (e.g., UHD-compliant classic image content). Examples of such UHD detail include, but are not limited to, adding color in saturated areas, adding accent details, and adding feature details. The objective is for the UHD-compliant classic image content to have an as-viewed (e.g., from a distance) character that exactly replicates that of the legacy-type classic image content. All colors and all spatial effects, such as vignetting, transfer perfectly because the low frequencies of the reconstructed image are copied directly from the classic image.

As a skilled person would appreciate, such an ideal implementation of color match processing would not work in practice for several reasons. For example, this ideal implementation of color match processing assumes that a magnitude of high spatial frequency detail in the original image content matches what is needed in the legacy-type classic image content. As skilled person would recognize that this is often not the case.

In practice, aesthetic detail in legacy-type classic image content and corresponding original image content can be far different from each other depending on local contrast in each. Moreover, the contrast in the legacy-type classic image content and corresponding original image content may vary a lot across the gray scale and therefore across the image spatially, and may even approach zero in saturated areas. Still further, such aesthetic detail will vary differently for different colors.

Advantageously, embodiments of the present invention provide for practicable implementation of color match processing. Such embodiments can overcome the aforementioned issues by measuring and comparing the intensity of spatially local markers that appear in both of the image contents (i.e., classic and original), and use the ratio of the intensity of these markers to predict a gain that should be applied to the high frequencies of the original image content to equal the missing high frequencies of the classic image content. As an example, the intensity of the middle spatial frequencies, which exist in both of the image contents, is used as a regional predictor of how the high spatial frequencies should be modified to match those lost from the classic image. Beneficially, contrast and cross colors affect middle spatial frequencies in the same manner as high spatial frequencies. Thus, once the magnitude of the high spatial frequencies of the original image content has been regionally corrected to the classic image content, the high frequencies are added into the classic image content to form resulting reconstructed UHD image content (e.g., UHD-compliant classic image content).

As a refinement to color match processing, the classic image content may be further band limited to reduce the crossover point. This can be beneficial because, in many cases, the highest frequencies of the classic image content may contain electronic artifacts, surface defects, and unpredictable variability. In a preferred embodiment, the absolute value of the horizontal first derivative of the original image content is added to the absolute value of the vertical first derivative of the original image content, thereby forming a magnitude original. The same operation is performed on the classic image content to form a magnitude classic. This method has the advantage of enabling centering magnitude of high frequency details on actual edges. It can also be desirable to apply a wide blur and fade filter whereby regions with very little signal will inherit the characteristic of nearby areas of more certainty. This can be followed by an even wider blur and an even more complete fade back. This can be done in other ways with the ultimate purpose being so that an area of the image with very little detail will inherit the characteristic of surrounding areas rather than suffer from a wide uncertainty of noise.

With respect to chromatics, it is disclosed herein that processing a three-color image as three separate independent monochrome channels works very well. Although the cross-color gain at the high frequencies may be different, the human eye has low sensitivity to high spatial frequencies of the color channel. As such, the subtle differences in the cross-color gain at the high frequencies are typically invisible to the human eye. To perfect high frequency crossover, the two classic and original image content can be preprocessed into a luma-chroma color space such as YUV, thereby allowing the then the Y and UV images to be separately processed. The chroma-channel gains may be guided in weak areas by luminance gain because the chroma-channels may be subject to higher noise.

If the classic image is from an electronic form (e.g., DVD, tape or NTSC Laser Disc), then the chroma-channels may be much lower resolution than the luminance-channel. For example, with respect to NTSC Laser Disc in NTSC the Q color channel may exhibit more than 8 times lower horizontal resolution than the Y luminance channel. This can be managed in several ways. A preferred way is for the original to perform the same asymmetrical chroma blur on the original image in the production of blurred-original. Another option is to preprocess into a matching luma-chroma color space as above, such as YUV or YIQ. Then the three channels are processed as before but with lower transition frequencies for the chroma-channels.

Automated UHD Processing

In preferred embodiments, ultra high definition (UHD) processing of image content includes UHD aesthetic match processing and color match processing, both of which hare discussed above. The resultant of UHD processing is UHD-compliant classic image content. The UHD-compliant classic image content exhibits ultra high definition when displayed (e.g., when played back). Creation of the UHD-compliant classic image content is implemented using high resolution, high information content that is at or near an original source of image content (i.e., original image content having high resolution and dense imagery information) in combination with image content representing a particular aesthetic rendering of a Director or the like (i.e., classic image content characterized by Director's Intent).

As shown in FIG. 1, there are several steps in the automated processing to merge the classic image content and the original image content. The output of the automatic UHD processing provides image content offering ultra high definition appearance during playback (i.e., UHD-compliant classic image content). If additional adjustments are desired, preferred embodiments of the present invention are configured for allowing such adjustments to be selectively made by, for example, an image processing professional (e.g., a colorist).

Still referring to FIG. 1, a method configured in accordance with an embodiment of the present invention for creating image content offering ultra high definition appearance during playback (i.e., UHD-compliant classic image content) is shown. Classic image content (e.g., legacy-type) and original image content from which the classic image content was derived serve as input image content (blocks 102 and 104, respectively). Preferably, the original image content utilized is as close as possible to the originally-captured scene (i.e., as-filmed scene) as currently exists or available. The key attribute of the original image content is that is holds imagery details of the originally-captured scene (i.e., original imagery details) that have been altered or omitted during creation of corresponding classic image content (e.g., creation of classic image content from original image content corresponding thereto). In contrast to the original image content, classic image content exhibits attributes that reflecting the Director's Intent. Legacy-type classic image content will generally lacks attributes such as highlights, shadows, smooth grain, and resolution detail available from a corresponding OCN (i.e., original image content), However, legacy-type classic image content will preferably have color, contrast, vignetting, saturation, and other imagery details defined by the Director's Intent (director's imagery details). Accordingly, the original image content bears more information in the form of resolution, detail in the highlight and shadows, and ability to recover and image with less damage compared to the classic image content whereas, in contrast to the original image content, the classic image content includes imagery details defined by the Director's Intent.

For original image content that is a film format, a scanning operation is performed (block 106) for providing the original image content in a suitably configured digital file format (block 108). Preferably, image content in a film format is scanned with a high-resolution scanner that outputs a digital file at or above the resolution of original content format. Examples of suitable commercially available scanners include, but are not limited to, those offered under the brands ARRI, Lasergraphics and Northlight by their respective company(ies). Furthermore, additional cleanup of the original image content (now in digital file format at block 108) can be performed with one or more commercially-available tools (block 110). For example, additional defect removal can be performed using one or more commercially available tools offered under the brand Color ICE and Black ICE by their respective company(ies).

In some instances, as shown in FIG. 2, providing the original image content in a suitably configured digital file format will require converting the original image content from being in a negative exposure format (NE) to a positive exposure format (PE). The polarity (positive/negative) of the original image content and of the classic image content, which is always positive, needs to be the same. Thus, if the original image content is negative, it will need to be inverted and made into positives. For example, the negative-to-positive inversion can be defined as one over the original pixel values raised to a power and scaled by maximum value. Optionally, the transfer curve of the original image content can be generally matched to the classic image content, for example, by changing the gamma. or apply a different (e.g., user-defined) transfer curve. This does not need to be precise, and can be done many ways as known in the art.

Next, the original image content that has been suitably pre-processed into a digital form (block 112) and the classic image content (block 102) are subjected to UHD processing (block 114) for producing image content offering ultra high definition appearance during playback (block 116). Such image content offering ultra high definition appearance during playback is also referred to herein as an UHD-compliant classic image content (i.e., extended range image content). The UHD-compliant classic image content is a restored version of the original image content with the color and intensity of the classic. Advantageously, as discussed below in greater detail, the UHD-compliant classic image content also maintains all the resolution and information content of the original image content and has an area greater as large as the original image content (i.e., area of the restored version of the original image content extends beyond the area of the mask). In this respect, the UHD-compliant classic image content is a newly created instantiation of image content characterized by classic mage content that is provided with UHD attributes and that maintains the aesthetic characterization defined by the Director's Intent and, thus, combines desirable imagery features of the classic image content with desirable imagery features of the corresponding original image content If it is determined that the UHD-compliant classic image content requires additional touch-up, such additional touch-up can be implemented accordingly (block 118) such as, for example, by a colorist to produce UHD-compliant classic image content so adjusted (block 120). After such additional touch-up or if such additional touch-up is not required, the UHD-compliant classic image content is subject to final formatting (block 122) to produce a ready for distribution version of the UHD-compliant classic image content (block 124).

The UHD-compliant classic image content (i.e., the output from the UHD process) is a full resolution series of digital frames. For commercial use, this UHD-compliant classic image content is preferably encoded using industrial standards and formatted for a device to be used for playback of the UHD-compliant classic image content. Examples of such standards include, but are not limited to, perception quantizer (PQ) curve, International Telecommunications Union's (ITU) recommendation BT.2020 (i.e., Rec. 2020) and High Efficiency Video Coding (HEVC) series 265 (i.e., H.265).

Figure 3:
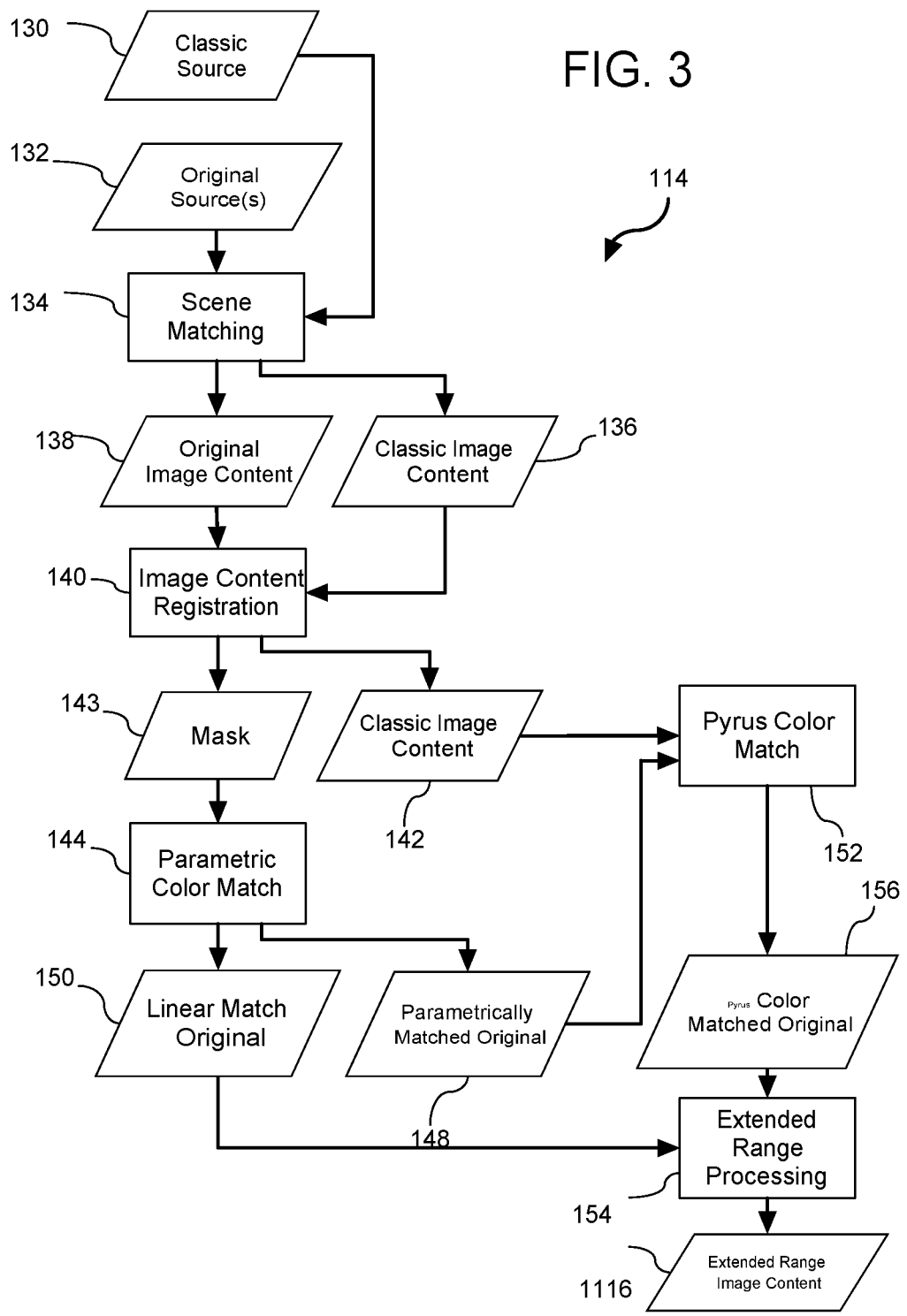
FIG. 3 is a flow diagram view showing a method configured in accordance with an embodiment of the present invention for implementing UHD processing of classic and original image content.

Referring now to FIG. 3, in a preferred embodiment, UHD processing (block 114 in FIG. 1) begins with frames of the original image content (block 130) that match the frames of the classic image content (block 132) being selected (block 134), thereby producing matching classic image content frames (136) and original image content frames (138). Such frame selection is required because there are often multiple takes for each scene in the original image content. In addition, only part of the selected take may be cut and used for the classic image content. It is disclosed herein that the original and classic image contents can be matched on a per-frame and/or per-scene basis. Image content of a frame or a scene is referred to herein as visual imagery.

It is disclosed herein that the original image content cam be from one or more original image content sources. For example, a first original image content source can be an original camera negative of a background and a second original image content source can be a 'green screen' media. In this respect, a plurality of original image content sources jointly define the original image content.

Figure 4:
FIG. 4 is a color photograph view showing registration (e.g., alignment and scaling) of classic image content with respect to corresponding original image content.

The classic image content (e.g., frames thereof) and the original image content frames (e.g., frames thereof) are subjected to one or more operations for registering each frame or scene in the classic image content with a respective frame or scene of the original image content (block 140) to produce classic image content that is framed/aligned (block 142) with respect to the original image content and a mask (block 143) defining the overlapping area of the classic and image contents (e.g., matching visual imagery of frames and/or scenes thereof). One operation associated with such registration involves the classic image content (e.g., frames thereof) being cropped for formatting and/or for Director's Intent compared to the original image content frames (e.g., frames thereof). Another operation associated with such registration involves color, dynamic range and content of the classic image content being modified for the Director's Intent. Still another operation associated with such registration involves the classic image content being re-formatted and compressed for the intended media. As shown in FIG. 4, yet another operation associated with such registration involves the classic image content and original image content being scaled the same and aligned on a per-frame and/or per-scene basis to define a respective image content mask (M) that defines a boundary of the overlapping area of the classic and original image contents.

The classic image content has an equal or lower resolution compared to the original image content and, typically, has had additional processing (sharpening, compression, etc). The classic image content is often a cropped from the original image content so it contains a smaller area of the original image content. In some cases, an area encompassing visual imagery of the original image content comprises only a portion of the visual imagery of the classic image content (e.g., the classic image content comes from a plurality of sources). The colors in the classic image content are also different from the original image content such as due to the Director's Intent. Accordingly, given classic image content that can be very different in resolution, information content, color and area from the corresponding original image content, the classic image content typically needs to be aligned and warped to match the original image content spatially to be useful as an input in UHD processing. In addition, regions that are common to both the original image content and the aligned classic image content (i.e., image content mask) need to be known. For example, the original image content usually contains image content beyond the boundaries of the classic image content, and sometimes a "green screen" dropout has been used to substitute foreign image into the classic image content that is not in the original image content, and therefore, the areas of the green screen are not common.

Still referring to FIG. 3, UHD processing (block 114, also in FIG. 1) configured in accordance with embodiments of the present invention can include parametric color match processing (block 144) that determines parameters of an equation relationship between the colors and intensities of the classic image content compared to the original image content. A primary purpose of the parametric color match processing is to approximate close match of the colors (and their respective intensities) of the classic image content (i.e., Director's Intent color) in the original image content based on the area of the classic image content and original image content that is common therebetween (i.e., in the case where the classic image content is cropped from within the original image content).

Output of the parametric color match processing includes original image content that has been parametrically matched to color in the classic image content (block 146—i.e., parametrically color matched original image content) and original image content that has been linear matched to color in the classic image content (block 150—i.e., linear color matched original image content). The parametrically color matched original image content is characterized by having color that approximates that of the classic image content and that has accent and feature details in areas corresponding to those of the classic image content that are unsaturated. In this respect, the parametrically color matched original image content is a version of the original image content that has color that closely approximates that of the classic image content and that has accent and feature details corresponding to that in areas that are in the saturated range of the classic image content (i.e., saturated areas in the classic image content are also saturated in the parametrically color matched original image content). In contrast, with respect to the linear color matched original image content, areas of the original image content that correspond to saturated areas of the classic image content are unsaturated according to a linear regression (i.e., a regression) between the original and original image contents. For example, as discussed below in greater detail with respect to FIG. 5A, a linear regression (i.e., an example of color comparison information) is developed from a scatter plot of color intensities between the classic and original image contents. This linear regression is used to adjust color intensity of unsaturated areas of the original image content to color intensities dictated by the linear regression of the classic and original image contents. In this respect, the linear color matched original image content carries the aesthetic characterization of the classic image content into areas of the original image content that are saturated in the classic image content.

It is disclosed herein that parametric color match processing can be implemented frame-by-frame, or scene-by-scene, or an obvious combination of frame-by-frame and scene-by-scene. For example, in a panned scene, when the camera passes through a low information segment, it can be preferable to base parametric color match on frames before and after the low information segment.

Still referring to FIG. 3, UHD processing (block 114, also in FIG. 1) configured in accordance with embodiments of the present invention can include pyrus color match processing (block 152) and extended range processing (block 154). The pyrus color match uses a multi-frequency level blurring and the mask (see block 143 in FIG. 3) to determine the best information to use for the particular pixel in determining the color match.). In this respect, the ratio of the colors of the classic image content in comparison to the original image content outside the overlapped area are estimated based on the proximity of the pixel to the overlapped area. The pyrus color match processing, which has the parametrically matched original image content (block 146) and classic image content (e.g., block 142) as its input, allows for color variations across a scene (or frame) and beneficially accommodates visual color fit between the two image contents than the parametric color match processing is capable of creating. The classic image content is used as a source for highlight details within unsaturated areas thereof. These highlight details (e.g., feature and accent details) are also present in the original image content. Original image content that has been parametrically and pyrus color matched to the classic image content is the output of the pyrus color match processing (block 156—i.e., pyrus color matched original image content). Such output is a version of the original image content that matches the color attributes (e.g., Director's Intent) of the classic image content with a high degree of accuracy (i.e., markedly higher than the output of the parametric color match process) but without feature and accent detail in areas that correspond to areas of the classic image content with saturated colors. Such feature and accent detail is otherwise present in the unprocessed original image content (e.g., block 104 in FIG. 1), but has been lost during the parametric color match process as a result of applying the Director's Intent to the original image content.

The extended range processing, which has the pyrus color matched original image content (block 156) and the linear color matched original image content (block 150) as its input, makes use of information within the linear color matched original image content to create higher dynamic range than is available in the classic image content without losing imagery details defined by the Director's Intent. Output of the extended range processing is extended range image content (block 116; see also in FIG. 1) that combines desirable imagery characteristics of the classic image content with desirable imagery characteristics of corresponding original image content processing is the output of the extended range (i.e., UHD-compliant classic image content also referred to herein as the extended range image content). More specifically, the output of the extended range processing is a version of the original image content that identically or nearly identically matches the color attributes (e.g., Director's Intent) of the classic image content and that has feature and accent detail in areas that correspond to areas of the classic image content with saturated color.

As discussed above, the pyrus color matched original image content matches the color attributes (e.g., Director's Intent) of the classic image content with a high degree of accuracy (i.e., markedly higher than the output of the parametric color match process) but without feature and accent detail in areas that correspond to areas of the classic image content with saturated colors (i.e., this feature and accent detail is otherwise present in the unprocessed original image content—e.g., block 104 in FIG. 1). Advantageously, extended range processing in accordance with embodiments of the present invention serve to recapture color and highlights in areas of the original image content that have become saturated during parametric and/or pyrus color match processing. In preferred embodiments, extended range processing is implemented in a manner that recaptures color and highlights while preserving the overarching aesthetic character of the Director's Intent. To this end, recapture of such color and highlights can be implemented in a manner whereby the degree of recapture is inversely related to a unit area of a particular portion of the image content. For example, deriving extended range image content can include determining a proportionality for unsaturating color in portions of the pyrus color matched original image content that are within the color saturation range of the classic image content, wherein the proportionality for unsaturating color for a particular portion of the pyrus color matched original image content is performed as a function of degree of saturation of the particular portion and a relative size of the particular portion with respect to adjacent portions thereof. In one example of such extended range processing, a window and light shining through it has been intentionally saturated so as to mute the presence of the window and light relative to a person standing in front of the window (i.e., make the person the focal point of the scene). In such case, color and highlights for such particular portion of the image content is recaptured but to a relatively low degree because the window and light shining through it make up a substantial portion of an encompassing area. However, in another example of such extended range processing, edges of sequins on a dress and other nearby shiny objects make up a relatively small portion of an encompassing area. As such, color and highlights for such particular portion of the image content is recaptured to a relatively high degree because the sequins and other nearby shiny objects make up a relatively small substantial portion of an encompassing area.

Figure 5A:
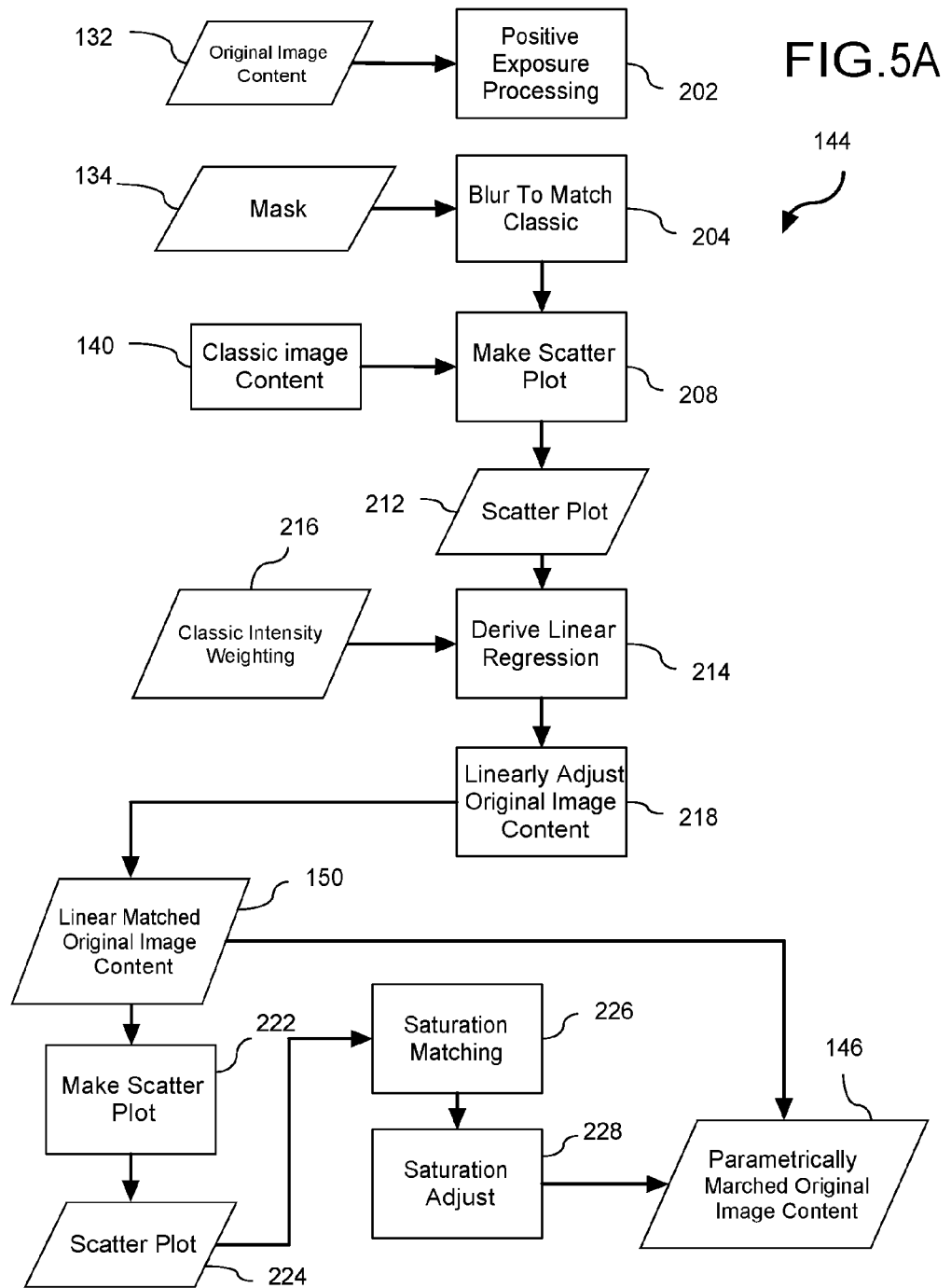
FIG. 5A is a flow diagram view showing a method configured in accordance with an embodiment of the present invention for implementing parametric color match processing.

Turning now to a discussion of the parametric color match processing (block 144 in FIG. 3), a detailed process for implementing such parametric color match processing is discussed in reference to FIG. 5A. The parametric color match processing assumes an equal relationship across each of the image contents (i.e., classic and original) for each color and determines an average relationship. If a region of one of the image contents is different from the other, the average relationship will not capture the difference. The quality of the fit depends on the number of parameters, for example lightness, color, color intensity in all 3 dimensions, shadow and highlight saturation, and so forth. Not all of these parameters can be fully solved in all frames that lack parts of the gray scale. Accordingly, parametric color match processing is best done over a larger number of frames and fewer parameters than can be solved unambiguously. In preferred embodiments, parametric color match processing is used to get close to a suitable set of color match parameters and then the pyrus color match processing (block 152 in FIG. 3) is implemented for matching color between the image content to a fine level of resolution in a manner that overcomes the limits of parametric matching and that provide visually perfect (or near perfect) matching. The pyrus color match processing is discussed below in greater detail in reference to FIG. 7.

Still referring to FIG. 5A, a specific implementation of the parametric color match processing (block 144) is disclosed. Such specific implementation begins the original image content (block 132; see also in FIG. 3), which is in or is processed (block 202) to be within a positive exposure format (as discussed in greater detail above in reference to FIG. 2), being blurred (block 204) to match a corresponding portion of the classic image content (block 134, see also in FIG. 3). This blurred original image content (block 208) is then compared in the overlapping area against the corresponding portion of the resized and registered classic image content (block 140; see also FIG. 3) to create a virtual scatter plot (block 212). A weighted linear regression (block 214) uses data from the scatter plot and from weighting indicating color intensities in the classic image content (block 216), followed by adjusting (block 218) in accordance with the linear regression to create linear matched original image content (block 150, see also in FIG. 3). The linear regression can be used to define a linear relationship of color of the original image content to the classic image content (i.e., color comparison information) such as, for example, via creation of a scatter plot (blocks 222, 224). In preferred embodiments, the linear regression specifies 6 color match parameters, which are level and slope of red, green, and blue. Embodiments of the present invention can further identify highlight and shadow regions in each of the colors to produce 6 or more additional parameters (e.g., 12 total color match parameters). It is disclosed herein that higher order and cross terms in the regression can create a better fit, but at the expense of potential errors in image content with limited greyscales.

Saturation matching (block 226) is performed using data from the scatter plot (block 224) of the linear matched original image data (block 150) followed by saturation adjustment (block 228) being performed on the linear matched original image data (block 150). In this respect, the linear terms are adjusted first and the highlight and saturation terms are found and applied to the adjusted original image content. Accordingly, dependent upon the aforementioned twelve (12) color match parameters, the original image content is used to create the parametrically color matched original image content (block 146, see also in FIG. 3). The underlying objective of saturation matching and saturation adjustment is applying Director's Intent with respect to color saturation. To this end, portions of the linear matched original image content having color that is in a color saturation range of the classic image content are determined and adjusting the original image content portions to have a degree of saturation as a function of the color saturation range of the classic image content (e.g., a linear regression derived as a function of the linear matched original image content and the classic image content).

Figure 5B:
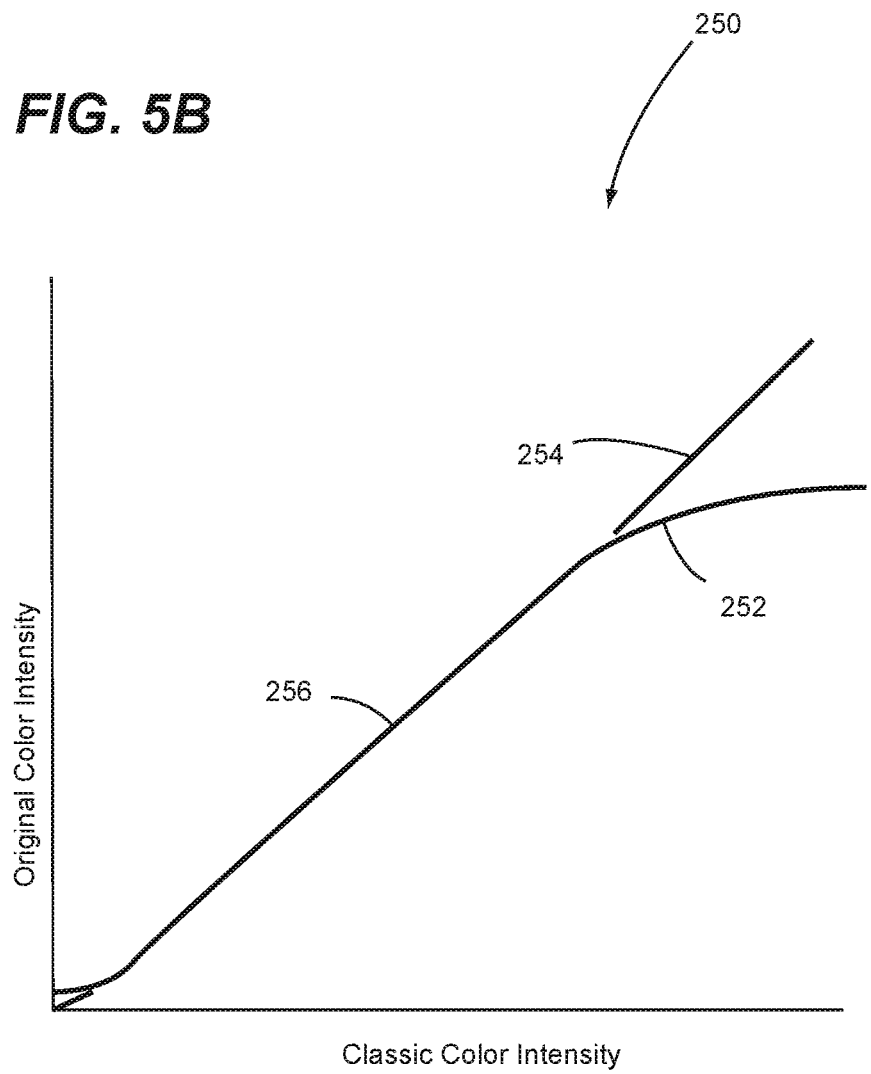
FIG. 5B is a diagrammatic view showing a color match correlation in the form of a regression derived classic and original image content.

Referring to FIG. 5B, a color match correlation 250 is shown. The color match correlation 250 is in the form of a regression derived from classic and original image content. For example, the regression can be derived from a scatter diagram of pixel-by-pixel of color intensity comparison. The color match correlation 250 includes a parametric color match curve 252 and a linear color match curve 254. The linear color match curve 254 includes a linear portion 256 of the parametric color match curve 252 with linear extension above and below upper and lower limits of such linear portion of the parametric color match curve 252. As disclosed herein, the parametric color match curve 252 and the linear color match curve 254 are utilized in adjusting color intensity of the original image content as a function of the classic image content to create respective color matched versions of the original image content.

FIG. 6 shows an example of parametric linear fit corrected original image content being matched to corresponding classic image content, such as provided for by parametric color match processing discussed above in reference to FIG. 5A. A non-saturating parametric relationship of the color space of the original image content, compared to the classic image content, is determined for the overlapping areas, and this equation is used to adjust the colors of the original image content to approximately match the color of the classic image content in a global sense. This is typically matched across the middle parts of the gray scale to avoid anomalies caused by saturation at the ends of the gray scale. The implementation as disclosed is purely linear, i.e. brightness and slope, however other higher order terms can be added, such as gamma.

Figure 7:
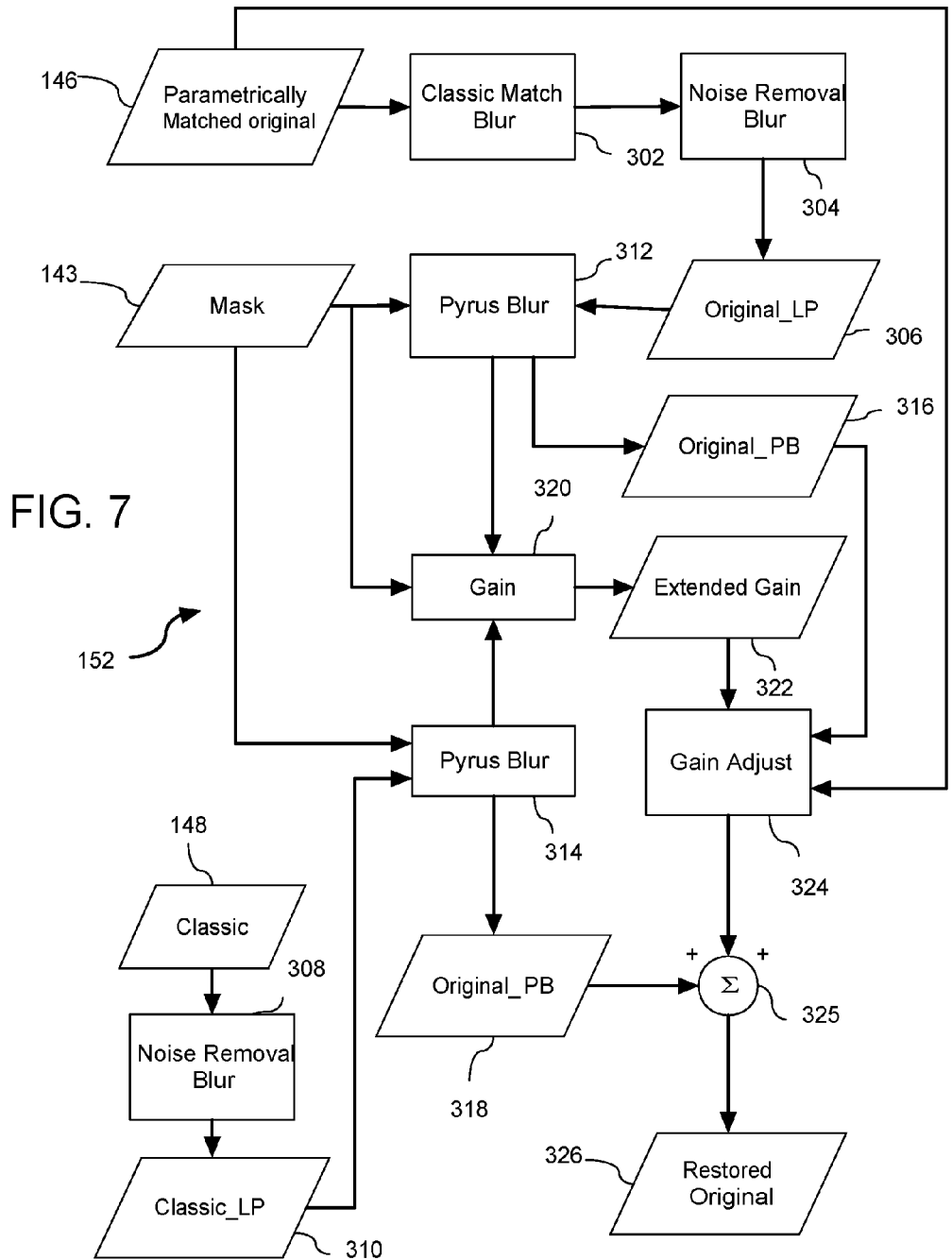
FIG. 7 is a flow diagram view showing a method configured in accordance with an embodiment of the present invention for implementing pyrus color match processing.

Turning now to a discussion of the pyrus color match processing (block 152 in FIG. 3), a detailed process for implementing such pyrus color match processing is discussed in reference to FIG. 7. Pyrus color match processing allows for color variations across image content (e.g., a scene thereof). Pyrus color match processing also accommodates a better visual color fit between original and classic image content than parametric color match processing is capable of creating. Regional color matching works best when the differences between the classic and original image contents are first minimized (preferably globally minimized). The linear color match is preferably also used with the regional color match for creating the extended range image content.

Referring to FIG. 7, the parametrically matched original (block 146: see also in FIGS. 3 and 5) is blurred (block 302) to match the classic image content (e.g., a frame or scene thereof) and is blurred (block 304) to remove noise, resulting in a low-pass blurred version (e.g., via a low frequency filter) of the original image content (block 306), which creates lower frequencies or low pass of the parametrical match in color between the classic and original image contents. The lower frequencies produce an image that is a better match to the low pass classic, eliminate noise, and avoid high frequency information. This low pass image is passed into the pyrus blur operation (block 312) for creating a corresponding bandpass image (i.e., mid frequencies).

The resized and registered classic image content (e.g., a frame or scene thereof) with defined edges (block 148; see also in FIG. 3) is also blurred (block 308) to remove noise, resulting in a low-pass blurred version (e.g., via a low frequency filter) of the classic image content (block 310). The low-pass blurred version of the classic image content (block 310) exhibits lower frequencies or low pass of the classic image content. The lower frequencies produce an image that eliminates noise, and avoids artifacts. This low pass image is passed into the pyrus blur operation (block 314), which creates a bandpass image (i.e., mid frequencies).

The low pass original image content and the classic image content are both subjected to pyrus blur operations (blocks 312, 314, respectively) using a mask (block 143; see also in FIG. 3) that defines the overlapping area of the original and classic image contents, thereby producing a pyrus blurred version of the classic image content (block 316) and a pyrus blurred version of the classic image content (block 318).

Each one of the pyrus blur operations includes a series of blur actions applied to the respective image content and the mask at successively lower frequencies. The resulting blurred image content is divided by the resulting blurred mask, thereby allowing the image content being extended beyond the mask boundaries (i.e., classic image content being extrapolated to the boundaries of the original image content). The resolution or frequency can decrease gradually beyond the mask boundaries. It is disclosed herein that the lower frequency component can carry the information farther the from the mask boundaries.

Parameters defining the pyrus blur operations (blocks 312, 314) for the original image content and the classic image content are used in an pyrus color match gain process (block 320) for determining an pyrus color match gain (block 322). This pyrus color match gain is applied to the difference (block 324) of the parametrically color matched original image content (block 146) and the pyrus blurred original image content (block 316), with a resultant thereof being added (block 325) to the pyrus blur of the classic image content to create a version of the original image content with the color and intensity of the classic (block 326). In this respect, the low pass parametrically matched image (block 146), the low pass classic image (block 148), and the mask (block 143) are used to determine the conversion or gain parameters to get the colors of the parametrically matched original image content to regionally match the classic image content whereas the parametric color match was implemented for globally match the classic image content. The low pass images from the blur operations are used to create band pass images to determine the conversion parameters regionally. The regionally color matched image is used in the linear region of the parametric match and, in the saturation regions, the pixel intensities are determined by extending the parametric match beyond the saturation intensities in each channel.

Preferably, all computations are performed in floats (or doubles) so that no data is saturated and so that minimal quantization occurs. Advantageously, the restored version of the original image content also maintains all the resolution and information content of the original image content and has an area greater than the classic image content and as large as the original image content (i.e., area of the restored version of the original image content extends beyond the area of the mask).

Figure 8:
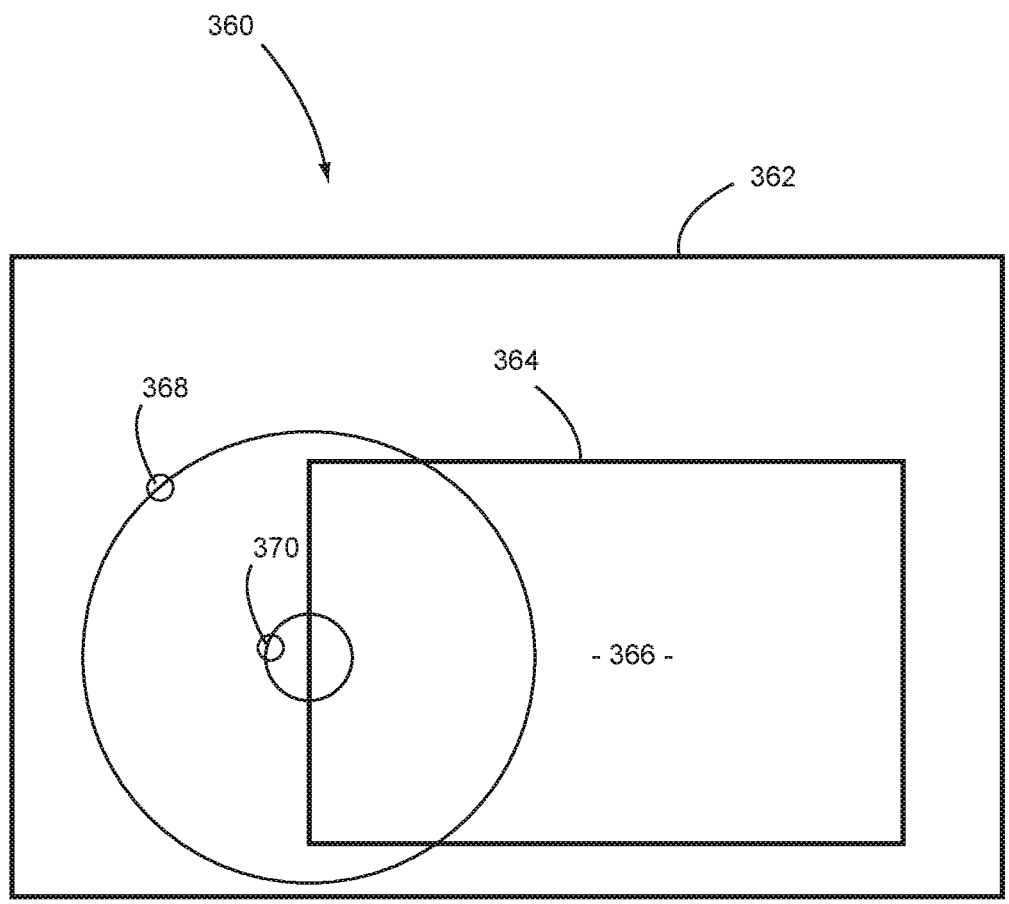
FIG. 8 is a diagrammatic view showing a representation of regional color match correlation.

FIG. 8 shows a representation of regional color match correlation 360. The regional color match correlation 360 allows for a higher level of precision in color match of the original image content 362 to the classic image content 364 via the pyrus color match. Specifically, the parametric color match adjusts color characteristics of the original image content 362 as a function of a global color match correlation (e.g., the parametric color match curve 252 in FIG. 5B) thereby producing a globally color matched version of the original image content. The global color match correlation is derived from an overlapping area 366 of the classic image content 364 and original image content 362. In contrast, the pyrus color match is performed for adjusting color characteristics of each one of a plurality of different regions of the globally color matched original image content as a function of a respective one of a plurality of regional color match correlations. Each of the regional color match correlations is derived from a corresponding region of the overlapping area 366 of the classic image content 364 and original image content 362. For example, as shown in FIG. 8, the closer a pixel is outside the overlap boundary 364, the more high frequency information it takes from the overlap area 366. In this respect, if the pixel is just outside a boundary 364 of the overlapping area 366 (e.g., pixel 370), the estimate for that that pixel is derived from the pixels just inside the overlap area 366. If the pixel outside the overlap area 36 is far from the boundary (e.g., pixel 368), the estimate is mostly derived from the lower frequency blur components of the overlap area 366. In a preferred embodiment, being defined by the respective position of the particular region refers to being defined by a distance from the particular region outside of the overlapping area 363 to the boundary of the overlapping area.

Figure 9:
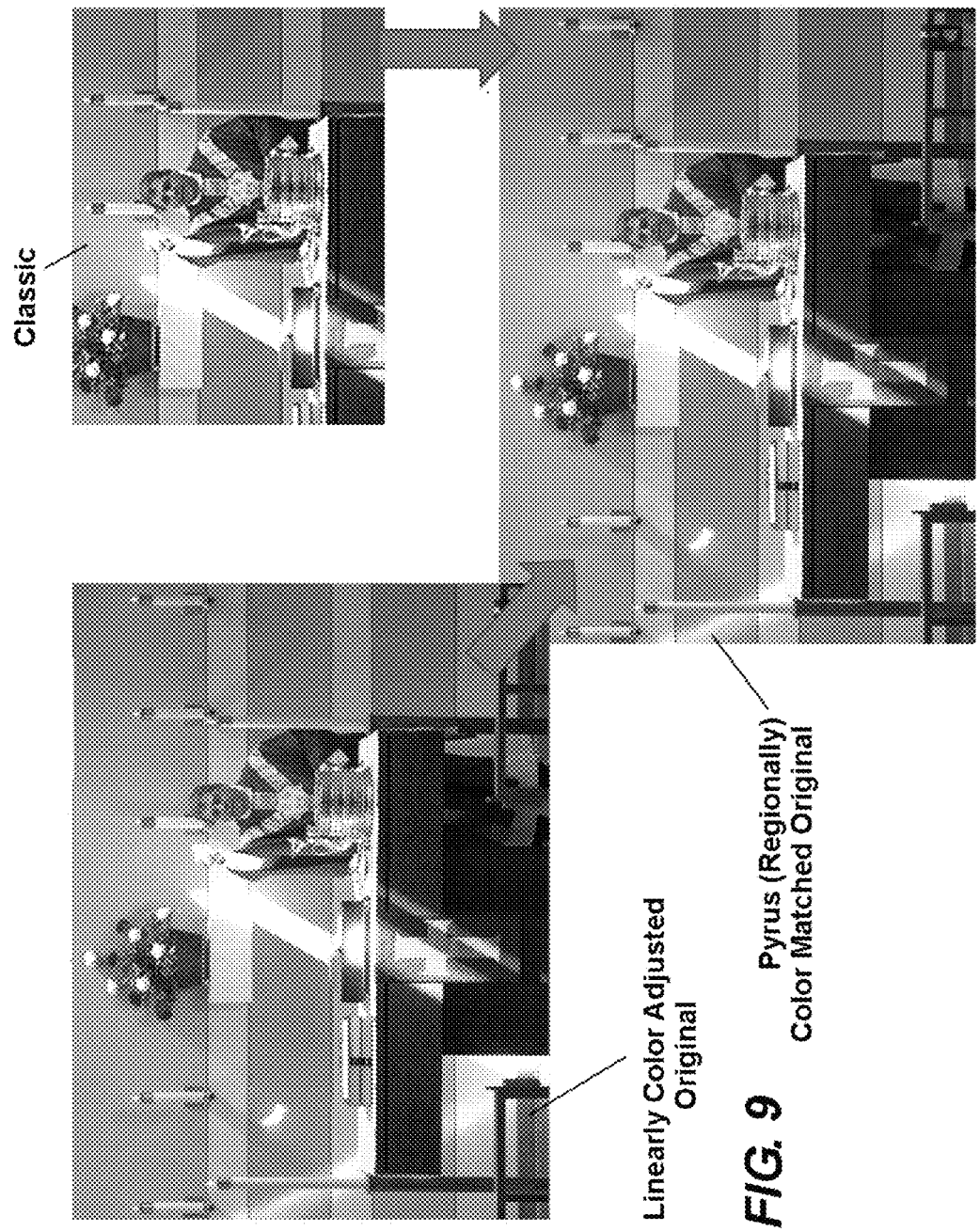
FIG. 9 is a color photograph view showing linear matched original image content and corresponding classic image content used to create color matched original image content.

FIG. 9 shows linear matched original image content and corresponding classic image content used to create color matched original image, such as provided for by pyrus color match processing discussed above in reference to FIG. 7. The parametrically linear corrected original image content of FIG. 6 is only globally matched with respect to the to the classic image content, and therefore is imperfectly color matched region-by-region. In FIG. 9, the parametrically linear corrected original image content is regionally color and luminance matched to the corresponding classic image content using low frequency image content information (e.g., from low pass blur) and high frequency image content information (e.g., from pyrus color match gain computations(s)). In addition, a best-fit match can extend into areas in which the classic and original image content does not overlap.

Figure 10:
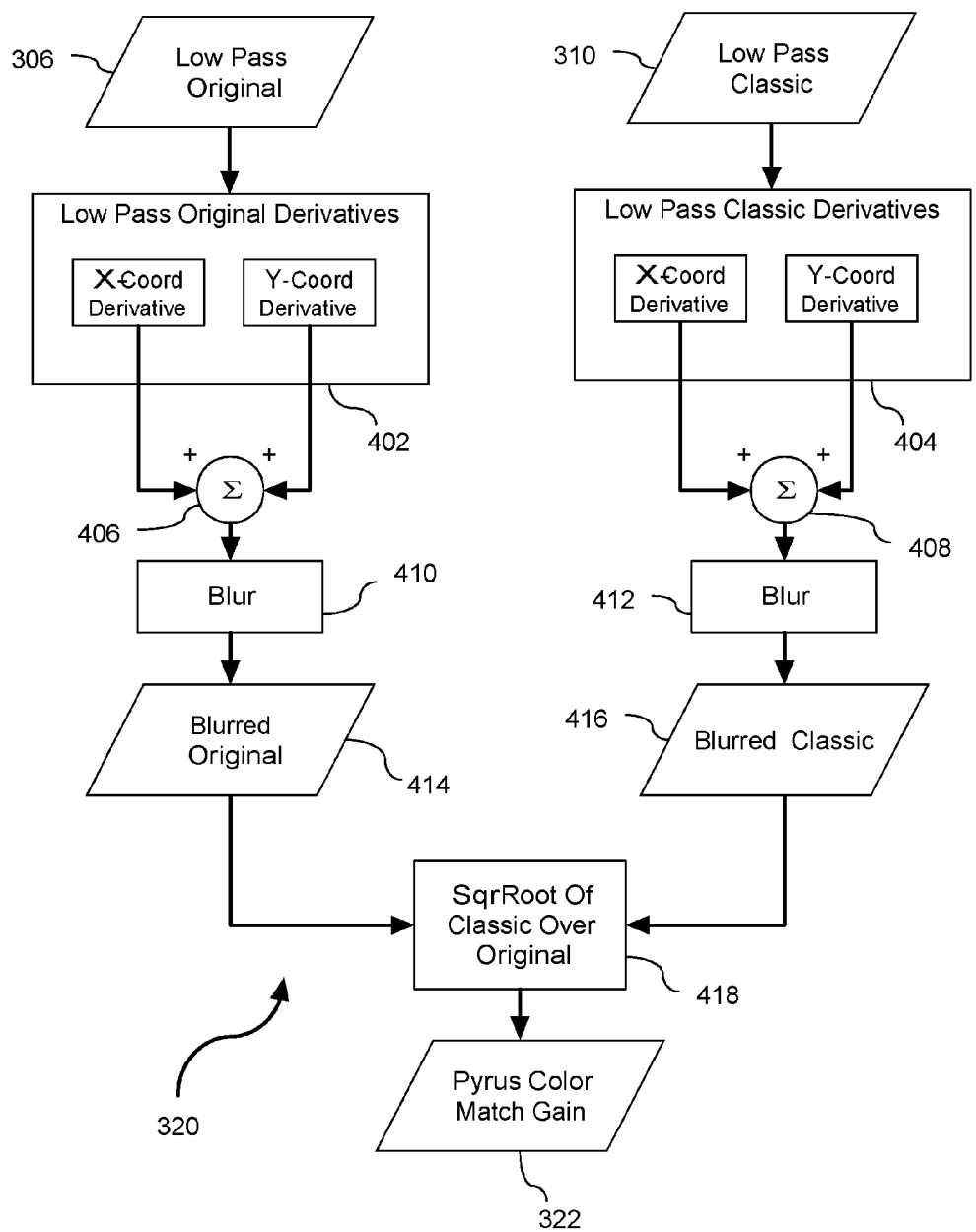
FIG. 10 is a flow diagram view showing a method configured in accordance with an embodiment of the present invention for determining pyrus color match gain.

As shown in FIG. 10, in a preferred embodiment, the pyrus color match gain (block 320 in FIG. 7 includes the low-pass original image content (block 306) and the low-pass classic image content (block 310) having derivatives thereof (block 402 and 404, respectively) decomposed into respective horizontal terms and vertical terms. For each pixel, the square of the horizontal terms and the square of the vertical terms for the low-pass original image content derivatives (block 402) are added together (block 406) and the square of the horizontal terms and the square of the vertical terms for the low-pass classic image content derivatives (block 404) are added together (block 408) for each pixel, followed by the resulting images from the classic and derivative summations each being blurred (block 410, 412 respectively) to produce blurred classic and original derivative image content (block 414, 416, respectively). The square root (block 418) of the ratio between the blurred classic derivative image content and the blurred original derivative image content is taken to produce the pyrus color match gain (block 322; see also in FIG. 7).

The low pass version of the parametrically match original image (block 306) is filtered to produce a bandpass version (block 414) of the parametrically matched original (block 146 in FIG. 7). In the depicted embodiment, derivatives and low pass blurs are used to create the mid-frequencies. The low pass version of the classic image (block 310) is filtered to produce a bandpass version (block 416) of the classic image content (block 148 in FIG. 7). In this embodiment, derivatives and low pass blurs were used to create the mid-frequencies. The square root (block 418) of the ratio between the classic bandpass and original bandpass determines the regional gains. Of course standard reasonableness as applied by a person of ordinary skill in the art needs to be taken into account (e.g. no divide by zero).

In view of the disclosures made herein, a skilled person will understand that the parametric color match provides global adjustment of color of the original image content with respect to the overlapping area of the classic image content and the pyrus color match provides regional adjustment of color of the original image content. More specifically, the parametric color match is a first color match process that is followed by the pyrus color match, which is a second color match process. The parametric color match process adjusts color characteristics of the original image content as a function of a global color match correlation (e.g., global color match regression) derived from the overlapping area of the classic and original image contents thereby producing a globally color matched version of the original image content. The pyrus color match is a second color match process that is performed after the first color match process for adjusting color characteristics of each one of a plurality of different regions of the globally color matched original image content as a function of a respective one of a plurality of regional color match correlations (e.g., regional color match regressions). Each of the regional color match correlations is derived from a corresponding region of the overlapping area of the classic and original image contents.

Advantageously, the pyrus color match allows for color adjustment of visual imagery outside of an area of the classic image content in a manner that takes into account a 'best-approximation' of the Director's Intent within the area of the original image content. For example, when a respective position of a particular region of the globally color matched original image content is located outside of the overlapping area, the corresponding region to the at least one of the particular region of the globally color matched version of the original image content is within the overlapping area at a position defined by the respective position of the particular region of the globally color matched version of the original image content (e.g., positions are similar distance from a perimeter boundary of the overlapping area).

Presented now is a discussion of extended range processing (block 154 in FIG. 3). The extended range processing makes use of additional information of the scan of the original image content to create higher dynamic range original image content (extended range image content) than is available in the classic image content, but without losing the Director's Intent. More specifically, extended luminance and color is extracted from the original image content for small areas without changing the Director's Intent for large areas. As a result, for large areas, the color and luminance are the same, but for small areas that were saturated or clipped in the classic image content, more information and brightness is placed into in the pyrus color matched original image content (see FIG. 9) to produce extended range image content. The extended range image content retains the original director's aesthetic as borne in the classic image content, while at the same time has at least a portion of the resolution, extended color, sparkle, and extended dynamic range that was captured and coded in the original image content. This extended range image content is a newly created instantiation of image content (i.e., UHD-compliant classic image content) characterized by classic mage content that is provided with UHD attributes and that maintains the aesthetic characterization defined by the Director's Intent and, thus, combines desirable imagery features of the classic image content with desirable imagery features of the corresponding original image content.

Figure 11A:
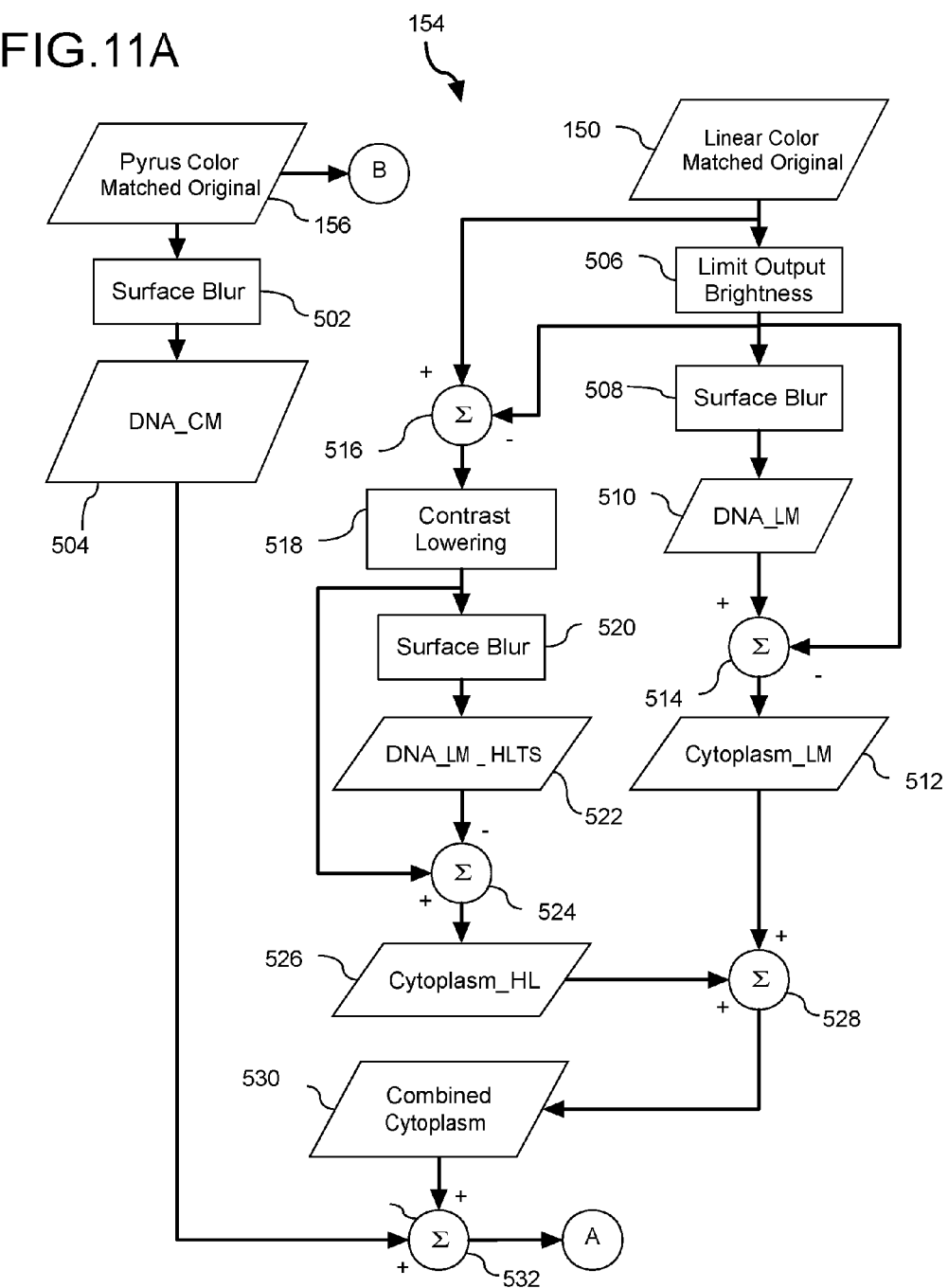
FIGS. 11A and 11B are a flow diagram view showing a method configured in accordance with an embodiment of the present invention for implementing extended range processing.
Figure 11B:
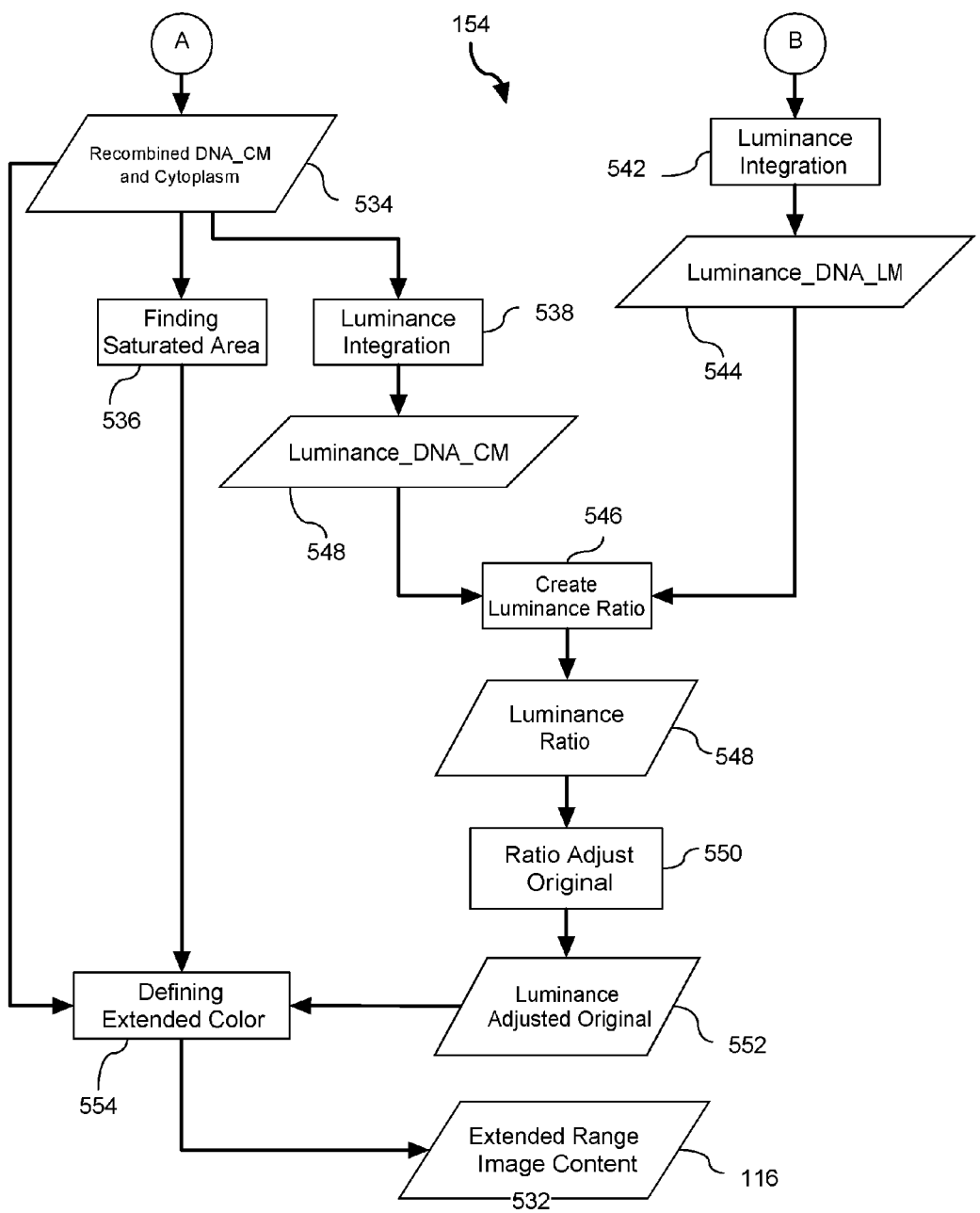

Referring now to FIGS. 11A and 11B, in a preferred embodiment of the present invention, extended range processing (block 154; see also in FIG. 3) includes pyrus color matched original image content (block 156; see also in FIG. 3) being processed with a surface blur (block 502) that does not exceed the gradient of the input edges, thereby producing a surface blurred version of the pyrus color matched original image content (block 504), which is referred to herein color matched original image content DNA (DNA_CM). For example, this surface blur may be implemented using a "surface blur" tool such as that found in Adobe Photoshop, in which integrated weighting is a function of both distance and of pixel count level spread. The surface blur contemplated in this disclosure is used as a control in many commercial implementations of shadow fill, such as "Digital SHO" such as sold by Imadio Images, and in the shadow extension function of Adobe Photoshop.

The pyrus color matched original image content (block 504) exhibits the overall color for the entire area of the original image content that matches the classic image content, as produced from the pyrus color matched original image content 156. The linear matched original image content (block 150) is used for details and extended range information. The linear matched original image content in the linear region is used to create the detail for the intensities for that region of intensities. The linear matched original image content outside the linear region is used to create the detail and intensities (i.e., color intensities) for the saturated intensities regions of the classic image.

Parametrically linear color matched (i.e., linear matched) original image content (block 150; see also in FIG. 3) is subjected to a brightness limiting process (block 506), which allows saturated highlights to be processed separately. Output of brightness limiting process is processed with the aforementioned surface blur (block 508), thereby producing a surface blurred version of the parametrically linear color matched (i.e., linear matched) original image content (block 510), which is referred to herein linear color matched original image content DNA (DNA_LM). The brightness limiting process limits the brightness of the parametrically linear color matched original image content to a range equal to or approximately equal to (i.e., derive from) the brightness of the classic image content.

Output of the brightness limiting process is computationally subtracted (block 514) from the linear color matched original image content DNA (DNA-LM) to produce linear color matched original image content Cytoplasm (Cytoplasm-LM; block 512). Output of the brightness limiting process (block 508) is computationally subtracted (block 516) from the linear color matched original image content, the resulting image content of which is then subjected to a contrast lowering process (block 518). The contrast lowering process lowers the contrast of very bright regions of the applied image content. Such applied image content has a brightness above that allowed by the classic image. Ideally, there is also a roll-off of contrast for very bright areas. Assuming the brightness allowed by the classic image is 1, the brightness lowering can be accomplished by the function Ln(X+1), or natural logarithm of X+1. Output of the contrast lowering process (block 518) is processed with the aforementioned surface blur (block 520), thereby producing a surface blurred version of the output of the contrast lowering process (block 518), which is referred to herein linear color matched original image content DNA highlights (DNA_LM_Highlights). Output of the surface blur is computationally subtracted (block 524) from the linear color matched original image content, thereby producing image content referred to herein as the Highlight Cytoplasm (block 526).

The linear color matched original image content Cytoplasm (block 512) and the Highlight Cytoplasm (block 526) are computationally combined (block 528) to produce Combined Cytoplasm (block 530). The color matched original image content DNA and the Combined Cytoplasm are computationally combined (block 532) to produce recombined DNA+Cytoplasm color matched original image content (Recombined DNA+Cytoplasm_CM; block 534).

The recombined DNA+Cytoplasm color matched original image content is subjected to a saturated area finding process (block 536) and to a luminance integration process (block 538). The luminance integration process for the recombined DNA+Cytoplasm color matched original image content produces a luminance value (block 540), which is referred to herein as Recombined color matched DNA luminance (luminance_DNA_CM). The term luminance as referred to herein is a synonymous with brightness. The parametrically linear color matched original image content (block 140) is subject to a luminance integration process (block 542). The luminance integration process for the parametrically linear color matched original image content produces a luminance value (block 544), which is referred to herein as linear color matched DNA luminance (luminance_DNA_LM). The Recombined color matched DNA luminance and the linear color matched DNA luminance are subjected to a luminance ratio process (block 546), which produces a luminance ratio (block 548) for the Recombined color matched DNA luminance with respect to the linear color matched DNA luminance. The luminance ratio is applied (block 550), parametric linear matched original image content, which produces the modified linear color match (block 552).

The luminance ratio (block 546) of the recombined color matched image (i.e., color and detail) to the linear matched original image content determines how much of the linear marched original image content to use at each pixel. This modified linear match original image content (block 552) is then combined with the recombined color match image content (block 534) to create the extend range image.

Figure 12:
FIG. 12 is a color photograph view showing a comparison of the extended range image content and pyrus color matched original image content.

The recombined color matched original image content DNA (block 534) and the modified linear color match (block 552) are subjected to a subjected to an extended color definition process (block 554) for producing the extended range image content (block 116; see also in FIGS. 1 and 3). The function of the extended color definition process is to combine the recombined DNA+Cytoplasm color matched original image content (block 534) and the modified linear color match (block 552) such that the image content of the modified linear match image prevails where saturation occurs, thereby creating the extended range image content. The recombined DNA+Cytoplasm color matched original image content is used to determine where such saturation occurs. FIG. 12 shows a comparison of the extended range image content and pyrus color matched original image content.

As discussed above, embodiments of the present invention are directed to an "original" that is matched to a "classic". However, in certain embodiments of the present invention, image content is limited to an "original". But such original image content that does not have a corresponding source of corresponding existing classic image content can greatly benefit from being processed in accordance with all or a portion of the UHD processing disclosed herein. Such processing will retain feature and accent details (e.g., sparkles) and highlight color while preventing large areas (e.g., sky, windows, lights, etc) from blinding a viewer or exceeding the global display power budget of a display apparatus. To this end, "classic" image content can be derived during such UHD processing from the original image content. For example, a user could adjust the normal controls of "lift-gamma-gain" of RGB on a scan, as is normally done, to produce a normal adjusted image. That then becomes the "classic" for which the UHD processing performs color match and extended range functionalities to restore highlight colors and feature and accent details without blinding brightness in large areas. Similarly, the "lift-gamma-gain" could be rendered in automation using one of many existing autocolor programs. Accordingly, such implementation of the present invention expands on what is disclosed as being classic image content to include a rendering that is done contemporaneously with the UHD processing.

The disclosures presented herein have been made in the context of a traditional definition of color (e.g., a full spectrum color such as red, green, blue and combinations thereof). However, embodiments of the present invention are not limited to such traditional definitions of color. Embodiments of the present invention are equally applicable to image content partially of fully comprising 'grayscale color'. Grayscale color preferably refers to different relative proportions of white and black within a uniform pattern of dots. As such, it is disclosed herein that the term 'color' can be broadly construed to be traditional color or grayscale color.

A skilled person will readily understand that the present invention can be embodied as a system that performs UHD processing in accordance with the disclosures herein. For example, such a system can be in the form of a data processing apparatus (computer workstation or the like) coupled to a film scanner and executing instruction (e.g., accessed from a non-transitory computer readable medium) that causes UHD processing to be formed on classic image content received via a digital network interface of the data processing apparatus. An example of the UHD processing is discussed herein in reference to FIGS. 1 and 3. In preferred embodiments, the UHD processing results in creation of a non-transitory computer readable medium (e.g., storage media, optical disc, semiconductor-based memory device, or the like) having tangibly embodied thereon and accessible therefrom processor-interpretable information defining a displayable visual experience (i.e., UHD-compliant classic image content defining a visual experience such as a feature film). In accordance with UHD processing disclosed herein, the processor-interpretable information comprises extended range image content jointly derived from image content of at least one original image content source and from image content of a classic image content source. The classic image content is a derivative of the original image content. The extend range image content is characterized by extended range image content defined by a Director's Intent of the classic image content.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A non-transitory computer-readable storage medium having tangibly embodied thereon and accessible therefrom instructions interpretable by at least one data processing device, the instructions are configured for causing the at least one data processing device to perform a method comprising:
    providing original image content and classic image content, wherein the classic image content includes at least a portion of visual imagery of the original image content;
    determining an overlapping area of the original image content and the classic image content in which the visual imagery of the classic image content aligns with the visual imagery of a corresponding portion of the original image content;
    determining color attributes of the classic image content that characterize post-processing actions performed with respect to the original image content, wherein said color attribute determining includes comparing image color information from the classic and original image contents within the overlapping area;
    creating color matched original image content characterized by having said color attributes applied thereto; and
    applying extended range image content to the color matched original image content, wherein applying the extended range image content includes determining color in areas of the color matched original image content that are in the saturated color condition with respect to a color saturation range of the classic image content and adjusting color in at least a portion of the areas of the color matched original image content that are in the saturated color condition to a color unsaturated condition.

2. The non-transitory computer-readable storage medium of claim 1 wherein
    the original image content is a selected one of a plurality of frames of image content each including respective visual imagery.

3. The non-transitory computer-readable storage medium of claim 1, further comprising:
    using the classic image content and the portion of the original image content to the determine aesthetic characterization thereof, wherein using the classic image content and the portion of the original image content to the determine aesthetic characterization includes determining regression derived from the classic image content and the original image content within the overlapping area.

4. The non-transitory computer-readable storage medium of claim 1 wherein applying extended range image content includes:
    determining a proportionality for unsaturating color in portions of the color matched original image content that are within the color saturation range of the classic image content; and
    determining the proportionality for unsaturating color for a particular portion of the color matched original image content is performed as a function of degree of saturation of the particular portion and a relative size of the particular portion with respect to adjacent portions thereof.

5. The non-transitory computer-readable storage medium of claim 3, further comprising:
    applying the aesthetic characterization, wherein applying the aesthetic characterization includes:
        determining portions of the color matched original image content having color that is in a color saturation range of the classic image content and adjusting a degree of saturation of the portions of the color matched original image content as a function of the color saturation range of the classic image content; and
        applying the aesthetic characterization to an entire portion of the original image content.

6. The non-transitory computer-readable storage medium of claim 5 wherein applying extended range image content includes:
    determining a proportionality for unsaturating color in portions of the color matched original image content that are within the color saturation range of the classic image content; and
    determining the proportionality for unsaturating color for a particular portion of the color matched original image content is performed as a function of degree of saturation of the particular portion and a relative size of the particular portion with respect to adjacent portions thereof.

7. The non-transitory computer-readable storage medium of claim 1 wherein creating the color matched original image content includes:
    performing a first color match process for adjusting color characteristics of the original image content as a function of a global color match correlation derived from the overlapping area of said classic and original image contents thereby producing a globally color matched version of the original image content; and
    after performing the first color match process, performing a second color match process for adjusting color characteristics of each one of a plurality of different regions of the globally color matched original image content as a function of a respective one of a plurality of regional color match correlations each derived from a corresponding region of the overlapping area of said classic and original image contents.

8. The non-transitory computer-readable storage medium of claim 7 wherein:
a respective position of at least one of the regions of the globally color matched version of the original image content is located outside of the overlapping area; and
the corresponding region to the at least one of the regions of the globally color matched version of the original image content is within the overlapping area at a position defined by the respective position of the at least one of the regions of the globally color matched version of the original image content.

9. The non-transitory computer-readable storage medium of claim 7 wherein:
the global color match correlation includes a regression derived from visual imagery of the classic image content and visual imagery of the original image content within the overlapping area; and
each one of the regional color match correlations includes a regression derived classic and original image content from the corresponding region.

10. A computer implemented method, comprising:
providing original image content and classic image content, wherein the classic image content includes at least a portion of visual imagery of the original image content;
determining an overlapping area of the original image content and the classic image content in which the visual imagery of the classic image content aligns with the visual imagery of a corresponding portion of the original image content;
determining color attributes of the classic image content that characterize post-processing actions performed with respect to the original image content, wherein said color attribute determining includes comparing image color information from the classic and original image contents within the overlapping area;
creating color matched original image content characterized by having said color attributes applied thereto; and
applying extended range image content to the color matched original image content, wherein applying the extended range image content includes determining color in areas of the color matched original image content that are in the saturated color condition with respect to a color saturation range of the classic image content and adjusting color in at least a portion of the areas of the color matched original image content that are in the saturated color condition to a color unsaturated condition.

* * * * *